United States Patent
Halstvedt et al.

(10) Patent No.: US 9,965,876 B2
(45) Date of Patent: May 8, 2018

(54) METHOD AND APPARATUS FOR GRAPHICS PROCESSING OF A GRAPHICS FRAGMENT

(71) Applicant: ARM Limited, Cambridge (GB)

(72) Inventors: Andreas Engh Halstvedt, Trondheim (NO); Sean Tristram Ellis, Farnham (GB); Jorn Nystad, Trondheim (NO); Sandeep Kakarlapudi, Trondheim (NO)

(73) Assignee: Arm Limited, Cambridge (GB)

( * ) Notice: Subject to any disclaimer, the term of this patent is extended or adjusted under 35 U.S.C. 154(b) by 304 days.

(21) Appl. No.: 13/845,604

(22) Filed: Mar. 18, 2013

(65) Prior Publication Data

US 2014/0267377 A1  Sep. 18, 2014

(51) Int. Cl.
*G06T 1/20* (2006.01)
*G06T 11/40* (2006.01)

(52) U.S. Cl.
CPC .................................. *G06T 11/40* (2013.01)

(58) Field of Classification Search
CPC ..... G06T 15/503; G06T 2200/12; G06T 1/20; G06T 1/60
(Continued)

(56) References Cited

U.S. PATENT DOCUMENTS 5,841,447 A  11/1998 Drews
6,614,449 B1 * 9/2003 Morein .................. G06T 11/40
345/555

(Continued)

FOREIGN PATENT DOCUMENTS

EP  2016560 B1  4/2013
GB  2496394 A  5/2013

OTHER PUBLICATIONS

Young, "CSAA (Coverage Sampling Antialiasing)," NVIDIA Developer Zone, Available at: https://developer.nvidia.com/csaa-coverage-sampling-antialiasing.
(Continued)

*Primary Examiner* — Barry Drennan
*Assistant Examiner* — Phong Nguyen
(74) *Attorney, Agent, or Firm* — Vierra Magen Marcus LLP

(57) ABSTRACT

A graphics processing pipeline determines whether respective graphics processing operations, such as respective blends, respective depth tests, etc., to be performed at a stage of the graphics processing pipeline would produce the same result for each sampling point of a set of plural sampling points represented by a fragment being processed by the graphics processing pipeline. If it is determined that respective graphics processing operations would produce the same result for each of the sampling points, then only a single instance of the graphics processing operation is performed and the result of that graphics processing operation is associated with each of the sampling points. The number of instances of the graphics processing operations needed to process the set of plural sampling points which the fragment represents is reduced in comparison to conventional multi-sampling graphics processing techniques which perform graphics processing operations for fragments on a "per sample" basis. The determination of whether or not the same result would be produced for each sampling point of the set of plural sampling points is facilitated by providing metadata which indicates whether or not fragment data and/or stored sample data for use when processing the sampling points is the same.

17 Claims, 11 Drawing Sheets

(58) Field of Classification Search
USPC .................................. 345/501–506, 530, 557
See application file for complete search history.

(56) References Cited

U.S. PATENT DOCUMENTS

| | | | |
|---|---|---|---|
| 6,825,847 B1 | 11/2004 | Molnar et al. | |
| 8,233,004 B1* | 7/2012 | Molnar et al. | ................. 345/581 |
| 8,237,709 B2* | 8/2012 | Dorbie | .................... G06T 17/20 |
| | | | 345/423 |
| 2004/0183795 A1* | 9/2004 | Deering | ................ G06T 15/005 |
| | | | 345/419 |
| 2009/0033671 A1* | 2/2009 | Tuomi | .................... G06T 11/40 |
| | | | 345/545 |
| 2009/0073177 A1* | 3/2009 | Jiao | ........................... G06T 1/60 |
| | | | 345/501 |
| 2009/0195552 A1* | 8/2009 | Nystad | .................... G06T 11/40 |
| | | | 345/611 |
| 2012/0013629 A1* | 1/2012 | Fowler | ..................... G06T 9/00 |
| | | | 345/531 |
| 2014/0176568 A1* | 6/2014 | Bastos | ..................... G06T 1/20 |
| | | | 345/501 |
| 2014/0267315 A1* | 9/2014 | Minkin | ................... G06T 11/40 |
| | | | 345/501 |

OTHER PUBLICATIONS

Woligroski, "Anti-Aliasing Analysis, Part 1: Settings and Surprises," Apr. 12, 2011, Available at: http://www.tomshardware.com/reviews/anti-aliasing-nvidia-geforce-amd-radeon,2868-3.html.

Jimenez, et al., "Filtering Approaches for Real-Time Anti-Aliasing," ACM SIGGRAPH 2011 Course, Aug. 17, 2011, Available at: http://iryoku.com/aacourse/.

Combined Search and Examination Report dated Sep. 29, 2014 in GB Application No. GB1404710.4, 7 pages.

Office Action dated Apr. 10, 2017, in GB Application No. GB1404710.4.

* cited by examiner

METHOD AND APPARATUS FOR GRAPHICS PROCESSING OF A GRAPHICS FRAGMENT

BACKGROUND

The technology described herein relates to the processing of computer graphics, and in particular to a method of and an apparatus for performing, inter alia, multisampled graphics processing.

As is known in the art, graphics processing is normally carried out by first dividing the output to be generated, such as a frame to be displayed, into a number of similar basic components (so-called "primitives") to allow the graphics processing operations to be more easily carried out. These "primitives" are usually in the form of simple polygons, such as triangles.

The graphics primitives are usually generated by the applications program interface for the graphics processing system, using the graphics drawing instructions (requests) received from the application (e.g. game) that requires the graphics output.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates) in order to generate the desired output of the graphics processing system.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sampling points to be used to represent the primitive in the output, e.g. scene to be displayed). This is typically done using the positions of the vertices of a primitive.

The rendering process then derives the data, such as red, green and blue (RGB) colour values and an "Alpha" (transparency) value, necessary to represent the primitive at the sampling points (i.e. "shades" each sampling point). This can involve, as is known in the art, applying textures, blending sampling point data values, etc.

(In graphics literature, the term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sampling point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

A "fragment" is therefore effectively (has associated with it) a set of primitive data as interpolated to a given output space sampling point or points of a primitive. It may also include per-primitive and other state data that is required to shade the primitive at the sampling point (fragment position) in question. Each graphics fragment may typically be the same size and location as a "pixel" of the output (e.g. output frame) (since as the pixels are the singularities in the final output, e.g. display, there may be a one-to-one mapping between the "fragments" the graphics processor operates on (renders) and the output pixels, e.g. of a display). However, it can be the case that there is not a one-to-one correspondence between a fragment and an output (e.g. display) pixel, for example where particular forms of post-processing, such as downsampling, are carried out on the rendered image prior to displaying the final image.

(It is also the case that as multiple fragments, e.g. from different overlapping primitives, at a given location may affect each other (e.g. due to transparency and/or blending), the final pixel output may depend upon plural or all fragments at that pixel location.)

Correspondingly, there may be a one-to-one correspondence between the sampling points and the pixels of a display, but more typically there may not be a one-to-one correspondence between sampling points and output (e.g. display) pixels, as downsampling may be carried out on the rendered sample values to generate the output pixel values, e.g. for displaying the final image. Similarly, where multiple sampling point values, e.g. from different overlapping primitives, at a given location affect each other (e.g. due to transparency and/or blending), the final pixel output will also depend upon plural overlapping sample values at that pixel location.

One problem that is encountered when processing graphics for display (when displaying computer generated images) is that the displayed image is quantised into the discrete pixel locations of the display, e.g. screen or printer, being used. This limits the resolution of the image that is displayed and can produce unwanted visual artifacts, for example, where the resolution of the output display device is not high enough to display smooth lines. These effects are commonly referred to as "aliasing".

FIG. 1 illustrates such aliasing effects. The left-hand side of FIG. 1 shows the image to be drawn, and the right-hand side shows the actual image that is displayed. As can be seen, the desired smooth curve of the white object in fact has a jagged appearance on the display. This is aliasing. (In FIG. 1, each square represents a pixel of the display, and the crosses represent the points at each (x, y) pixel location for which the colour value for that pixel location is determined (sampled). For example, the pixel A in FIG. 1 is drawn as all white, because the colour sampling point for that pixel location falls within the white object. It should be noted that in FIG. 1 only sample crosses on the pixels of interest are shown, although in practice all pixels will be sampled.)

All aliasing artifacts that could be visible to the naked eye could be removed by using a sufficiently high resolution display. However, the resolution of electronic screen and printers is typically limited, and so many graphics processing systems use other techniques to try to remove or reduce the effects of aliasing. Such techniques are typically referred to as anti-aliasing techniques.

One known anti-aliasing technique is referred to as supersampling or oversampling.

In such an arrangement, there are plural sampling points (positions) per pixel of the final display, and a separate colour sample is taken for each (covered) individual sampling point (e.g. by rendering each sampling point as a separate fragment). The effect of this is that a different colour sample is taken for each sampling point of a display pixel that is covered by a primitive during the rendering process.

This means that plural colour samples are taken for each pixel of the display (one for each sampling point for the pixel, since a separate colour value is rendered for each sampling point). These plural colour samples are then combined into a single colour for the pixel when the pixel is displayed. This has the effect of smoothing or averaging the colour values from the original image at the pixel location in question.

FIG. 2 illustrates the supersampling process. In the example shown in FIG. 2, four sampling points are determined for each pixel in the display and separate colour samples are taken for each sampling point during the rendering process. (Each such sample can accordingly effectively be viewed as a "sub-pixel", with each pixel in the display being made up of four such sub-pixels.) The four colour value samples (sub-pixels) for a given pixel are then combined (downfiltered) such that the final colour that is used for the pixel in the display is an appropriate average (blend) of the colours of the four colour samples taken for the pixel.

This has the effect of smoothing the image that is displayed, and, e.g., reduces the prominence of aliasing artifacts by surrounding them with intermediate shades of colour. This can be seen in FIG. 2, where the pixel A now has two "white" samples and two "black" samples and so is set to 50% "white" in the displayed image. In this way, the pixels around the edges of the white object are blurred to produce a smoother edge, based on, e.g., how many samples are found to fall on each side of the edge.

Supersampling in effect processes the screen image at a much higher resolution than will actually be used for the display, and then scales and filters (downsamples) the processed image to the final resolution before it is displayed. This has the effect of providing an improved image with reduced aliasing artifacts, but requires greater processing power and/or time, since the graphics processing system must in effect process as many fragments as there are samples (such that, e.g., for 4× supersampling (i.e. where 4 samples are taken for each display pixel), the processing requirements will be four times greater than if there was no supersampling).

Other anti-aliasing techniques have therefore been proposed that, while still providing some improvement in image quality, have less processing requirements than full supersampling. One common such technique is referred to as "multisampling".

In the case of multisampling, multiple sampling points are again tested for each display pixel to determine whether a given primitive covers the sampling points or not when the image is rasterised into fragments (at the rasterisation stage). Thus the sampling point coverage of a primitive in a multisampling system is determined in a similar fashion to a "supersampling" system (and so the positions of the outer geometric edges of the primitives are still effectively "supersampled" (oversampled) in a multisampling system).

However, in the rendering process of a multisampling system, all the sampling points for a given display pixel that are covered by the primitive in question are allocated the same single, common set of colour value data (rather than each having their own separate set of data as would be the case for supersampling).

Thus, in multisampling, plural samples are again taken for each pixel that will make up the final display, but rather than determining a separate colour value for each sample when rendering the "pixel" for a given primitive (as would be the case for a full supersampling system), a single colour value is determined and applied to all the samples for a display pixel that are found to belong to the same primitive in the final image. In other words multisampling calculates a single colour value for a given display pixel for a given primitive in the scene, which colour value is applied to (reused for) all samples (subpixels) of the display pixel that are covered by that primitive (in contrast to supersampling where a separate colour value is determined for each sample).

Because only a single colour value is provided for multiple samples for a given display pixel, multisampling is less processing intensive than supersampling and therefore can allow faster processing and performance than supersampling. However, there is a reduction in the quality of the displayed image as compared to supersampling, since although objects' (primitives') edges are still sampled at a higher resolution, colours are not.

Furthermore, although only a single colour value is provided for a multisampled fragment, graphics processing operations (e.g. rendering operations) are still performed in respect of each sample of the multisampled fragment (i.e. on a "per sample" basis). For example, when blending a multisampled fragment which represents four samples, four blending operations are carried out, one in respect of each of the samples. This is because, for example, the colour value that is to be blended at each sample position may differ, e.g. because the sample positions have different colour values associated with them in the tile buffer (e.g. in a colour buffer) as a result of rendering other (earlier) primitives.

Notwithstanding this, many graphics processing systems use a multisampling anti-aliasing technique, as multisampling can in general provide adequate (and improved as compared to when there is no multisampling or supersampling at all) anti-aliasing in a rendered image, but without all the extra processing and computational burden that full supersampling entails.

The Applicants, however, believe that there remains scope for improved techniques which provide for further reductions in the amount of processing required to process sampling points in, inter alia, multisampled graphics processing pipelines.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
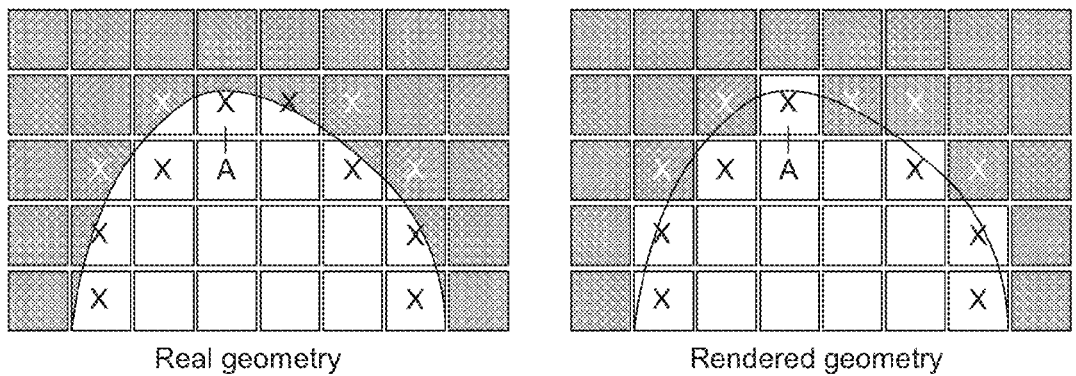
FIG. 1 shows schematically the effect of aliasing.
Figure 2:
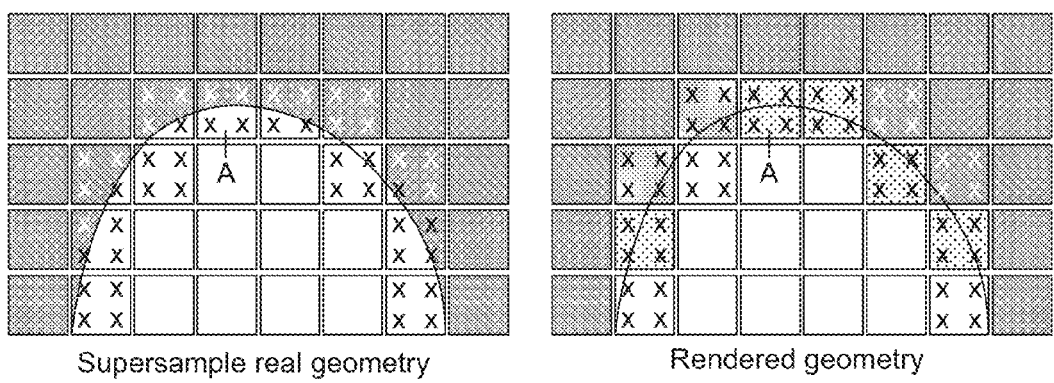
FIG. 2 shows schematically the supersampling anti-aliasing technique.

An embodiment of the technology described herein comprises a method of processing a graphics fragment in a graphics processing pipeline, wherein the graphics processing pipeline has a plurality of processing stages, and wherein graphics fragments to be processed by the graphics processing pipeline each represent a set of sampling points to be processed, the method comprising:

determining whether a graphics processing operation to be performed at a processing stage of the graphics processing pipeline on respective plural sampling points of a set of sampling points that a graphics fragment represents would, if performed at that processing stage of the graphics processing pipeline in respect of each of the plural sampling points, produce the same result for each of the plural sampling points;

if it is determined that the graphics processing operation would produce the same result for each of the plural sampling points, performing only a single instance of the graphics processing operation for the plural sampling points at that processing stage of the graphics processing pipeline to produce a result, the single instance of the graphics processing operation being performed in respect of only one of the sampling points of the plural sampling points to produce the result; and associating the result which is produced by the single instance of the graphics processing operation with each sampling point of the plural sampling points.

An embodiment of the technology described herein comprises a graphics processing pipeline comprising:

a rasteriser that generates graphics fragments and passes those graphics fragments to later stages of the graphics processing pipeline for processing, wherein each graphics fragment represents a set of sampling points; and a graphics processing stage that receives graphics fragments for processing, the graphics processing stage having processing circuitry configured to:

determine, for a graphics fragment it receives for processing, whether a graphics processing operation to be performed by that processing stage of the graphics processing pipeline on respective plural sampling points of the set of sampling points that the graphics fragment represents would, if performed in respect of each of the plural sampling points, produce the same result for each of the plural sampling points;

if it is determined that the graphics processing operation would produce the same result for each of the plural sampling points, perform only a single instance of the graphics processing operation for the plural sampling points to produce a result, the single instance of the graphics processing operation being performed in respect of only one of the sampling points of the plural sampling points to produce the result; and associate the result which is produced by the single instance of the graphics processing operation with each sampling point of the plural sampling points.

The technology described herein relates to a multisampled graphics processing pipeline, i.e. a pipeline that processes graphics fragments which each represent a set of sampling points (multisampled fragments). However, rather than always processing the sampling points of a given multisampled fragment individually (on a "per-sample" basis), the technology described herein determines whether or not respective processing operations for each of plural sampling points associated with a given fragment would produce the same result for each of the plural sampling points. If it is determined that the respective processing operations for the plural sampling points would produce the same result for each of the plural sampling points, then only a single processing operation is performed on only one of the plural sampling points. The result of the single processing operation is then associated with each of the plural sampling points.

The Applicants have identified that, in a graphics processing pipeline which processes fragments which each represent a set of sampling points, it can be the case that the same processing result will be provided for each of plural sampling points of a set of sampling points that a fragment represents at stages of the graphics processing pipeline, and that, moreover, that event can be determined in use. The technology described herein exploits this by performing only a single graphics processing operation for the plural sampling points, and associating (e.g. applying or using) the result of that operation in common for the plural sampling points, when this situation is identified.

Performing only a single graphics processing operation for the plural sampling points, rather than performing a plurality of "per-sample" graphics processing operations for the respective sampling points, can significantly reduce the amount of processing needed to perform graphics processing (e.g. rendering) in respect of the plural sampling points.

The fragments that are processed in the manner of the technology described herein are generated by a rasteriser of the graphics processing pipeline. The rasteriser will, as is known in the art, receive graphics primitives for processing and generate graphics fragments for processing by later (e.g. rendering) stages of the graphics processing pipeline based on the sampling positions that the primitives are determined by the rasteriser to cover. As is known in the art, the fragments may have "fragment data", such as colour, depth and/or transparency data, associated with them, with the fragment data for a given fragment in an embodiment being derived from primitive data associated with (the vertices of) the primitive to which the fragment relates.

The rasteriser of the graphics processing pipeline can be configured to operate in any suitable and desired manner, for example as in known rasterising arrangements. It should, as is known in the art, operate to generate graphics fragments for processing in dependence upon which sampling points (or which sets of sampling points) of an array of sampling points covering the area of the output of the graphics processing pipeline a given primitive, etc., received by the rasteriser covers (at least in part). The rasteriser in an embodiment generates a graphics fragment for each sampling point covered by, and/or for each set of plural sampling points (e.g., sampling mask) found to include a sampling point that is covered by, the (and each) primitive being rasterised.

Each fragment represents (has associated with it) a set of sampling points. The sets of sampling points that the fragments represent may each contain any suitable (plural) number of sampling points. In some embodiments, the fragments to be processed each represent a set of at least four sampling points. In some embodiments, the fragments to be processed each represent a set of at least two sampling points, or each represent a set of at least eight sampling points, or each represent a set of at least sixteen sampling points. In some embodiments, the fragments to be processed each represent a set of exactly four sampling points. In some embodiments, the fragments to be processed each represent a set of exactly two, eight or sixteen sampling points.

In some embodiments, the plural sampling points for which it is determined whether the same processing result would be produced (and for which the single instance of the graphics processing operation is performed) are all of the sampling points in the set of sampling points represented by the fragment. For example, where the fragment represents four sampling points, it may be determined that the processing result would be the same for each of the four sampling points which the fragment represents, and the single instance of the graphics processing operation may be performed in respect of one of the four sampling points to produce the result for all four of the sampling points which the fragment represents.

Alternatively, the plural sampling points for which it is determined whether the same processing result would be produced (and for which the single instance of the graphics processing operation is performed) may only be a subset of the set of sampling points represented by the fragment. For example, where the fragment represents four sampling points, it may be determined that the processing result would be the same for two (or three) of the four sampling points which the fragment represents, and the single instance of the graphics processing operation may be performed in respect of one of the two (or three) sampling points to produce the result for those two (or three) sampling points.

In these alternative embodiments, the determination of whether the same processing result would be produced for each sampling point in the subset of the set of sampling points which the fragment represents may only comprise considering the results for the sampling points in the subset (e.g. without considering the results for other sampling points in the set of sampling points which the fragment represents).

However, the determination of whether the same processing result would be produced for each sampling point in the subset of the set of sampling points which the fragment represents is in an embodiment as a consequence of determining whether or not the same processing result would be produced for all of the sampling points in the set of sampling points which the fragment represents. For example, as a consequence of determining whether or not the same processing result would be produced for all of the sampling points of the set of sampling points which the fragment represents, it may be determined that the same processing result would be produced for each sampling point in a subset of the set of sampling points which the fragment represents (but not for some or all of the remaining sampling points in the set of sampling points which the fragment represents).

For example, where the fragment represents a set of sampling points (e.g. a set of four sampling points), a determination may be made as to whether or not the same processing result will be produced for all of the sampling points (e.g. all four sampling points) of the set of sampling points which the fragment represents. As a consequence of this, it may be determined that the processing result will be the same for (only) a subset of the sampling points (e.g. two or three of the sampling points) in the set of sampling points which the fragment represents. The single instance of the graphics processing operation may then be performed in respect of one of the sampling points of the subset of the set of sampling points (e.g. in respect of one of the two or three sampling points for which the same result would be produced) to produce the result for that subset of the set of sampling points.

As will be appreciated, in these alternative embodiments, one or more further instances of the graphics processing operation may need to be performed in order to produce results for the remaining sampling points (i.e. the sampling points other than the plural sampling points for which the single instance of the graphics processing operation is performed) in the set of sampling points which the fragment represents. However, the number of instances of the graphics processing operations needed to process the set of sampling points which a fragment represents will still be reduced in comparison to conventional (e.g. multisampling) graphics processing techniques which perform graphics processing operations for fragments on a "per sample" basis.

The graphics processing pipeline is in an embodiment a tile-based rendering pipeline.

The graphics processing pipeline may contain any suitable and desired processing stages that a graphics processing pipeline may contain. In an embodiment, it includes, in an embodiment in this order, one or more of, and in an embodiment all of: the above mentioned rasteriser; an early depth (or an early depth and stencil) tester; a renderer, in an embodiment in the form of a fragment shader; a varyings position evaluation (interpolator) associated with the fragment shader; a late depth (or depth and stencil) tester; a blender; one or more tile buffers (in the case of tile-based rendering pipeline); and a tile writeback unit (again in the case of a tile-based rendering pipeline).

The graphics processing operation that is performed in the manner of the technology described herein may be any suitable graphics processing operation performed by the graphics processing pipeline, for example any graphics processing operation which would ordinarily be performed by a graphics processing pipeline on a "per-sample" basis. In an embodiment, the graphics processing operation is (at least) one of: a rendering operation, such as a fragment shading or blending operation; a culling test, such as a depth test or stencil test; and a multisampled resolve and writeback operation.

Correspondingly, the graphics processing stage that operates in the manner of the technology described herein may be any suitable stage of the graphics processing pipeline, for example any graphics processing stage which would ordinarily operate on a "per-sample" basis. In an embodiment, the graphics processing stage is (at least) one of: a rendering stage, such as a fragment shading or blending stage; a culling stage, such as a depth test or stencil test stage; and a multisampled resolve and writeback stage.

In an embodiment, graphics processing in the manner of the technology described herein is performed in respect of more than one graphics processing operation to be performed on the graphics fragments and/or at more than one stage of the graphics processing pipeline. Thus, in an embodiment, the graphics processing pipeline includes two (or more than two) processing stages that operate in the manner of the technology described herein.

Whether the graphics processing operation will produce the same result for each of the plural sampling points can be determined in any suitable and desired manner. However, the Applicants have recognised that a graphics processing operation which is to be performed in respect of a given sampling point will normally use (and the result of that graphics processing operation will normally be dependent on) particular sample data that is associated with that sampling point. The Applicants have further recognised that where that particular sample data is the same for each sampling point, the processing result will normally be the same for each sampling point.

Thus, in embodiments of the technology described herein, determining that the graphics processing operation would produce the same result for each of the plural sampling points comprises determining that the particular sample data which would be used in respective graphics processing operations for the plural sampling points will be the same for each of the plural sampling points.

The particular sample data that would be used in respective graphics processing operations for each of the plural sampling points may comprise, for example, "fragment data" (such as colour data, depth data, transparency data, etc.), that is associated with the fragment and that passes through the graphics processing pipeline with the fragment.

As is known in the art, when performing a graphics processing operation in respect of a multisampled fragment, fragment data (or a subset of fragment data) which is associated with the fragment may be reused for (or reapplied to) each of the sampling points in the set of sample points which the fragment represents. In other cases, fragment data (or a subset of fragment data) which is associated with the fragment may be reused for (or reapplied to) only some of the sampling points in the set of sample points which the fragment represents. This may be the case, for example, where the set of sampling points that the fragment represents is only partially covered by the primitive in question.

Thus, in embodiments of the technology described herein, determining that the particular sample data to be used in the graphics processing operation would be the same for each of the plural sampling points comprises determining whether the fragment is to be used to process (e.g. render) each of the plural sampling points (i.e. determining whether the fragment data which is associated with the fragment is to be used for processing (e.g. rendering) each of the plural sampling points) when performing the graphics processing operation.

The particular data that would be used in respective graphics processing operations for each of the plural sampling points may also or instead comprise other sample data that is not associated with the fragment per se but that is, for example, to be applied to the plural sampling points of the fragment or tested against the plural sampling points of the fragment, as part of the graphics processing operation. This other sample data may be "previously derived sample data" and/or "previously stored sample data", which may have been previously derived as a result of processing a previous fragment or fragments and/or stored, as is known in the art. This other sample data may be, and in an embodiment is, stored in or for the graphics processor, for example, in a tile buffer, colour buffer, depth buffer, stencil buffer, etc. of or for the graphics processor as is known in the art.

Thus, in an embodiment of the technology described herein, determining that the particular sample data to be used in the graphics processing operation would be the same for each of the plural sampling points comprises determining whether other sample data for the plural sampling points that the graphics processing operation is to use (uses) or is dependent on is the same for each of the plural sampling points.

The Applicants have recognised that some graphics processing operations may use both fragment data and other sample data, whereas other graphics processing operations may use only one or the other. Thus, in some cases, the particular data that would be used in the respective graphics processing operations for each of the plural sampling points comprises both fragment data and other sample data, or may not comprise fragment data (and may only comprise other sample data), or may not comprise other sample data (and may only comprise fragment data).

Thus, in an embodiment, where the graphics processing operation uses both fragment data and other sample data, it is determined both whether the fragment is to be used to process each of the plural sampling points when performing the graphics processing operation and whether the other sample data will be the same for each of the plural sampling points. Similarly, in an embodiment, where the graphics processing operation uses only fragment data and not other sample data, it is determined whether the fragment is to be used to process each of the plural sampling points when performing the graphics processing operation. Similarly, in an embodiment, where the graphics processing operation uses only other sample data and not fragment data, it is determined whether the other sample data will be the same for each of the plural sampling points.

In embodiments of the technology described herein, determining that the particular sample data to be used in the graphics processing operation would be the same for each of the plural sampling points initially comprises determining whether the graphics processing operation uses or is dependent on other sample data for the plural sampling points.

For example, where the graphics processing operation is a blending operation, it may be determined whether the particular blending operation being performed will blend fragment data values with other sample data values (e.g. will blend fragment colour values with other colour values for the plural sampling points in question). (This may be the case, for example, where the process or function (e.g. equation) used for the blending operation indicates that other sample data values are used in the blending operation and/or where an alpha value in the fragment data for the fragment indicates partial opacity (partial transparency) for the sample points represented by that fragment.) In this example, it will be determined that the graphics processing operation uses or is dependent on other sample data for the plural sampling points.

In another example, where the graphics processing operation is a blending operation, it may be determined whether the particular blending operation being performed will replace the sample data values with the fragment data values. (This may be the case, for example, where the process or function (e.g. equation) used for the blending operation indicates that other sample data values are not used in the blending operation and/or where an alpha value in the fragment data for the fragment indicates full opacity (no transparency) for the sample points represented by that fragment.) In this example, it will be determined that the graphics processing operation does not use or is not dependent on other sample data for the plural sampling points.

Thus, in an embodiment, determining whether the graphics processing operation uses or is dependent on other sample data for the plural sampling points comprises determining whether a process or function (e.g. equation) used for the blending operation indicates that other sample data values are used in a blending operation for the blending operation and/or determining whether an alpha value in the fragment data for the fragment indicates partial or full opacity for the sample points represented by that fragment. If a process or function (e.g. equation) used for the blending operation indicates that other sample data values are used and/or if partial opacity is indicated, then it is determined that the graphics processing operation uses or is dependent on other sample data for the plural sampling points. If a process or function (e.g. equation) used for the blending operation does not indicate that other sample data values are used and/or full opacity is indicated, then it is determined that the graphics processing operation does not use or is not dependent on other sample data for the plural sampling points.

If the graphics processing operation uses or is dependent on other sample data for the plural sampling points, then it is determined whether that other data is the same for each of the plural sampling points. If the graphics processing operation does not use or is not dependent on other sample data for the plural sampling points then that other data need not be (and is not) considered (and it may only be considered whether or not the fragment is to be used to process each of the plural sampling points when performing the graphics processing operation).

Similarly, in embodiments of the technology described herein, determining that the particular sample data to be used in the graphics processing operation would be the same for each of the plural sampling points initially comprises determining whether the fragment is to be used to process each of the plural sampling points when performing the graphics processing operation. If fragment data that is associated with the fragment is not used to process the fragment when performing the graphics processing operation then it need not be (and is not) considered whether or not the fragment is to be used to process each of the plural sampling points when performing the graphics processing operation (and only the other data may be (and is) considered).

The particular sample data that is associated with each sampling point to be used in the graphics processing operation (e.g. the fragment data and/or other sample data) may comprise one or more sample data values, for example, one or more of: a depth value; a colour value (e.g. an RGB value); and a transparency value (i.e. an alpha value) etc., associated with that sampling point. Thus, in embodiments of the technology described herein, determining that the particular sample data to be used in the graphics processing operation would be the same for each of the plural sampling points comprises determining that the same one or more sample data values are to be used for or applied to the plural sampling points in the graphics processing operation (e.g. the sampling points are associated with the same depth value (e.g. for a depth test), colour value (e.g. for a blending operation), transparency value, etc.).

The determination that the particular sample data to be used for the graphics processing operation would be the same for each of the plural sampling points may be achieved in any desired and suitable way. For example, the sample data values for the sampling points could be compared to see if they are the same.

However, in an embodiment, metadata associated with groups of plural sampling points is used to indicate that sample data values for those respective groups of plural sampling points are the same. The graphics processor may accordingly determine that the sample data values are the same for all of the plural sampling points using the metadata, e.g. by reading the metadata prior to carrying out the graphics processing operation for the plural sampling points. Embodiments therefore comprise (the graphics processor) using metadata to determine whether the sample data values for the plural sampling points are the same. This metadata can take any suitable and desired form.

In an embodiment, this metadata for the fragment data values comprises coverage information, in an embodiment in the form of a coverage mask, associated with the fragment. The coverage information in an embodiment indicates which sampling points of the set of sampling points that the fragment represents the fragment is being used to process (i.e. which sample points are covered by the primitive in question).

In an embodiment, where each fragment that is generated by the rasteriser can be associated with (and corresponds to and represents) a set of plural sampling points, then each such graphics fragment in an embodiment has associated with it coverage information indicating which of the sampling points in the set of sampling points that the fragment corresponds to are covered (e.g., and in an embodiment, by the primitive being sampled), i.e. in effect, which of the sampling points in the set of sampling points that the fragment corresponds to, the fragment is being used to process (render).

Thus, in an embodiment, the (and each) fragment has associated with it coverage information, in an embodiment in the form of a coverage mask (e.g. a bitmap), for one or more fragment data values (e.g. one or more of: a depth value, colour value, and/or transparency value etc). The coverage information (mask) for the fragment may indicate (e.g. with a "1" or "0") which ones of the set of sampling points that the fragment represents are to be processed for the primitive that the fragment is being used to process (i.e. which ones of the set of sampling points that the fragment represents are "covered" by the primitive). The graphics processor may accordingly determine that the fragment (and its fragment data value(s)) are to be used to process all of the plural sampling points using the coverage information (mask), e.g. by reading the coverage information (mask) prior to carrying out the graphics processing operation for the plural sampling points. Embodiments therefore comprise (the graphics processor) using coverage information (e.g. a coverage mask) to determine whether or not fragment data value(s) for the plural sampling points are the same.

In an embodiment, as discussed above, the plural sampling points are all the sampling points that the fragment represents, and the coverage information (e.g. a coverage mask) is used (by the graphics processor) to determine whether or not the fragment is being used to process (e.g. render) all the sampling points that the fragment represents (e.g. whether or not all the sampling points that the fragment represents are covered by the primitive in question).

For the "other sample data values", as discussed above, the graphics processor may determine whether or not the other sample data values in question are the same for the groups of plural sampling points by comparing those values, for example by reading the other sample data values for each of the plural sampling points in question from memory and comparing those other sample data values to see if they are the same. This can allow, for example, for the sample data values of non-predefined groups of plural sampling points to be determined to be the same.

However, in an embodiment, metadata for the other sample data values indicates whether a given sample data value or set of sample data values is the same for (predefined) groups of plural sampling points. In an embodiment, respective (predefined) groups of plural sampling points for which other sample data values are stored, each have respective metadata indicating whether the sample data value(s) of the other sample data for each of the plural sampling points in the groups is the same or not, associated with them.

The metadata may, e.g., be a flag or bit. The flag or bit may be set (e.g. to "1") when the value(s) of the other sample data value(s) is the same for the plural sampling points. The flag or bit may be unset (e.g. to "0") when the value(s) of the other sample data is not the same for the plural sampling points. The metadata is in an embodiment associated with (and stored in association with) the corresponding other sample data and thus may be, and is in an embodiment, stored, for example, in a buffer (tile buffer, colour buffer, depth buffer, stencil buffer, etc.) of or for the graphics processor, e.g. together with or separately from the other sample data. Other arrangements would, of course, be possible.

In these arrangements, the graphics processing stage/operation accordingly in an embodiment determines that the value(s) of the other sample data to be used in the graphics processing operation is the same for the plural sampling points using the metadata associated with the plural sampling points, e.g. by reading the metadata prior to carrying out the graphics processing operation for the plural sampling points. Embodiments therefore comprise (the graphics processor) using metadata to determine whether or not other sample data value(s) for the plural sampling points are the same.

A set of metadata (for the fragment data and/or for the other sample data) may be used to indicate that the data values are the same for all the data channels (respective types of data values) in the sample data (in the fragment data and/or other sample data).

For example, a single set of metadata may be provided for a plurality (e.g. some or all) of the types of data value (data channels) in the sample data, the single set of metadata indicating that the data value or values of those plural types of data value (data channels) are the same for the sample points in question. For example, there may be a single set of metadata that provides an indication for one or more (or all) of the data value types selected from: R colour; G colour; B colour; RGB colour; depth; and transparency (alpha).

In an embodiment, for the fragment data, there is a single set of metadata (e.g. a coverage mask) that provides the indication for RGB colour, transparency, and depth.

Alternatively, there may be separate sets of metadata provided (for the fragment data and/or for the other sample data) for respective data channels or subsets of data channels.

For example, in some embodiments, a separate set of metadata is provided for each given type of data value (data channel) in the sample data or for each subset of types of data value (subset of data channels), with each respective set of metadata indicating that the data value or values of that data channel (type) or subset of data channels (types) are the same for the sample points in question. For example, there may be a separate set of metadata that provides a separate indication for each of one or more of the data channels (value types) selected from: R colour; G colour; B colour; depth; transparency (alpha); RGB colour; and RGB colour/transparency (alpha).

In an embodiment, for the other sample data, there is a set of metadata (e.g. a bit) that provides an indication for RGB colour/transparency, and a separate set of metadata (e.g. a bit) that provides an indication for depth. This arrangement is advantageous since depth values are often stored (e.g. in a depth buffer) and used (e.g. for a depth test) separately from RGB colour and transparency values (which may, for example, be stored in a colour buffer for use in blending or shading operations).

The metadata can provide an indication that the data values in question are the same for any desired and suitable number of sampling points. In embodiments, the metadata (particularly for the fragment data) provides the indication for the same number of sampling points as the number of sampling points in the set of sampling points which each fragment represents. For example, where the fragments represent four sampling points, the metadata in an embodiment provides the indications for four sampling points. In another example, where the fragments represent sixteen sampling points, the metadata in an embodiment provides the indications for sixteen sampling points.

Other embodiments would of course be possible. For example, in some embodiments, the metadata provides an indication for more sampling points than (e.g. double or more than double) the number of sampling points in the set of sampling points which each fragment represents. For example, where the fragments represent four sampling points, the metadata may provide the indications for eight or more than eight sampling points.

In other embodiments, the metadata provides an indication for fewer sampling points than (e.g. half or less than half) the number of sampling points in the set of sampling points which each fragment represents. For example, where the fragments represent four sampling points, the metadata may provide the indication for two sampling points. In another example, where the fragments represent sixteen sampling points, the metadata may provide the indications for eight or fewer sampling points, four or fewer sampling points, or two sampling points.

Since the metadata indicates whether or not the sample data value(s) for the plural sampling points are the same, embodiments of the technology described herein comprise (when associating the result which is produced by the single instance of the graphics processing operation with each sampling point of the plural sampling points) associating metadata with the plural sampling points and/or updating metadata that is associated with the plural sampling points so as to indicate that sample data value(s) for the plural sampling points are the same.

In other circumstances (e.g. where other plural sampling points do not have the same result associated with them), embodiments of the technology described herein may comprise associating metadata with other plural sampling points and/or updating metadata that is associated with other plural sampling points so as to indicate that sample data value(s) for those other plural sampling points are not the same.

Embodiments of the technology described herein may therefore comprise associating metadata with plural sampling points and/or updating metadata that is associated with those plural sampling points so as to indicate whether sample data value(s) for those plural sampling points are the same or not. The metadata may then be used in later graphics processing to determine whether or not the sample data value(s) for those plural sampling points are the same.

It is believed that the use of metadata for indicating to a graphics processing pipeline whether or not other sample data for groups of plural sampling points has the same value is new and advantageous in its own right, and not merely in the context of the above described embodiments of the technology described herein.

Thus, an embodiment of the technology described herein comprises a method of operating a graphics processing pipeline, wherein the graphics processing pipeline has a plurality of processing stages and graphics fragments to be processed by the graphics processing pipeline each represent a set of sampling points corresponding to a set of sampling positions of an array of sampling positions representing an output to be generated by the graphics processing pipeline, the method comprising:

storing an array of sample data values to be used by a processing stage of the graphics processing pipeline when processing graphics fragments to generate an output to be generated by the graphics processing pipeline, the array of sample data values indicating sample data values to be used for respective sampling positions of the array of sampling positions representing the output to be generated by the graphics processing pipeline; and storing for respective groups of plural sampling positions that the stored array of sample data values represents, metadata indicating whether or not the plural sampling positions of each group are associated with the same stored sample data value in the stored array of sample data values.

An embodiment of the technology described herein comprises a graphics processing pipeline comprising:

a rasteriser that generates graphics fragments and passes those graphics fragments to later stages of the graphics processing pipeline for processing, each graphics fragment representing a set of sampling points corresponding to a set of sampling positions of an array of sampling positions representing an output to be generated by the graphics processing pipeline; and a plurality of graphics processing stages that receive graphics fragments for processing to generate an output to be generated by the graphics processing pipeline;

at least one memory storing an array of sample data values to be used by a processing stage of the graphics processing pipeline when processing graphics fragments to generate an output to be generated by the graphics processing pipeline, the array of sample data values indicating sample data values to be used for respective sampling positions of the array of sampling positions representing the output to be generated by the graphics processing pipeline; and processing circuitry configured to store for respective groups of plural sampling positions that the stored array of sample data values represents, metadata indicating whether or not the plural sampling positions of each group are associated with the same stored sample data value in the stored array of sample data values.

It will be appreciated by those skilled in the art that these embodiments of the technology described herein can, and in an embodiment do, include, as appropriate, any one or more or all of the optional features described herein.

Thus, for example, the stored array of sample data values in an embodiment comprises a tile buffer or buffers, which may include a colour buffer and/or a depth buffer and/or a stencil buffer, and/or in an embodiment comprises an array of colour values and/or an array of depth values.

Similarly, each group of plural sampling positions for which metadata is stored is in an embodiment (precisely all) the sampling positions of a respective set of sampling positions to which the fragments to be processed by the graphics processing pipeline will correspond. In this case, the metadata for a given group of sampling positions will indicate whether or not the plural sampling positions in the set of sampling positions that a fragment may be generated to represent (render) are associated with the same stored sample data value in the stored array of sample data values.

For example, where each fragment can be used to process a number (e.g. four, sixteen, etc.) sampling points corresponding to a corresponding number of sampling positions (e.g. four, sixteen, etc.), each group of plural sampling positions for which metadata is stored may comprise (only) that number of sampling positions, with the sampling positions of each group being a set of sampling positions that a fragment to be processed by the graphics processing pipeline will correspond to.

Thus, in an embodiment, the groups of sampling positions for which metadata is stored each comprise four, or sixteen, sampling positions.

Alternatively, where each fragment can be used to process a number sampling points (e.g. four, sixteen, etc.) corresponding to a corresponding number of sampling positions (e.g. four, sixteen, etc.), each group of plural sampling positions for which metadata is stored may comprise a subset of (e.g. half, quarter, etc.) that number of sampling positions, with the sampling positions of each group being a subset of the set of sampling positions that a fragment to be processed by the graphics processing pipeline will correspond to.

Similarly, where each fragment can be used to process a number sampling points (e.g. four, sixteen, etc.) corresponding to a corresponding number of sampling positions (e.g. four, sixteen, etc.), each group of plural sampling positions for which metadata is stored may comprise a multiple of (e.g. double, quadruple, etc.) that number of sampling positions, with the sampling positions of each group being the set of sampling positions that plural fragments (e.g. adjacent fragments) to be processed by the graphics processing pipeline will correspond to.

Also, embodiments comprise updating the stored metadata for each group (in an embodiment after determining whether or not to update the stored metadata) following a graphics processing operation, in an embodiment to indicate whether or not the plural sampling positions of the group are associated with the same stored sample data values.

For example, when the metadata for a group of plural sampling positions indicates that the plural sampling positions of that group are associated with the same stored sample data value, but a graphics processing operation causes the plural sampling positions of that group to be associated with different stored sample data values, the metadata for that group is in an embodiment updated to indicate that the plural sampling positions of that group are now associated with different stored sample data values.

Similarly, when the metadata for a group of plural sampling positions indicates that the plural sampling positions of that group are associated with different stored sample data values in the array of stored sample data values, but a graphics processing operation causes the plural sampling positions of that group to be associated with the same stored sample data value, the metadata for that group is in an embodiment updated to indicate that the plural sampling points of that group are associated with the same stored sample data value.

In an embodiment, the metadata associated with the stored sample data values is set to a default value or set of values (e.g. to indicate that the stored data values are all the same or are not all the same) when the stored data values are first stored, and then the metadata is appropriately updated (in the manner discussed above) as graphics processing operations cause the stored sample data values to change.

It will be appreciated that the steps of storing the sample data values and storing metadata associated with those sample data values may be performed at substantially the same time (e.g. concurrently or one after the other), or may be performed at substantially different times.

In any of the above embodiments of the technology described herein, since the metadata indicates whether or not the other sample data value(s) for the plural sampling points are the same, embodiments comprise (when reading the other sample data value(s) for use in a graphics processing operation), if the metadata indicates that all the sample data values in a set of plural sample data values to be read are the same, reading only a single instance of the other sample data value(s) for the plural sampling points.

This can thus be used to reduce the amount of resources used to read the other sample data for use in a graphics processing operation, even in the case where "per sample" graphics processing operations are being performed.

In this case, the read, single instance of the other sample data may then be used to perform the single instance of the graphics processing operation in respect of only one of the sampling points of the plural sampling points to produce the result for the plural sampling points (where that is to be done). However, even where "per sample" graphics processing operations are to be performed, the read single instance of the other sample data may be used for each instance of the graphics processing operation in respect of each of plural sampling points of a set of sampling points that a fragment represents, thereby avoiding the need to read that data multiple times.

It is accordingly again believed that the use of metadata in this way is new and advantageous in its own right, and not merely in the context of the above described embodiments of the technology described herein.

Thus, an embodiment of the technology described herein comprises a method of operating a graphics processing pipeline, wherein the graphics processing pipeline has a plurality of processing stages, and wherein graphics fragments to be processed by the graphics processing pipeline each represent a set of sampling points to be processed, and where there is other sample data to be combined with or compared with fragment data for the fragments, the method comprising:
  prior to performing a graphics processing operation at a stage of the graphics processing pipeline for plural sampling points of a set of sampling points that a graphics fragment represents:
  reading metadata associated with other sample data that is stored for the plural sampling points, the metadata indicating whether or not the plural sampling points are associated with the same stored sample data value to be used in the graphics processing operation;
  determining from the metadata whether the plural sampling points are associated with the same stored sample data value to be used in the graphics processing operation; and
  if it is determined from the metadata that the plural sampling points are associated with the same stored sample data value to be used in the graphics processing operation, reading only a single instance of the stored sample data value from the memory for use in the graphics processing operation at that stage of the graphics processing pipeline.

An embodiment of the technology described herein comprises a graphics processing pipeline comprising:
  a rasteriser that generates graphics fragments and passes those graphics fragments to later stages of the graphics processing pipeline for processing, wherein each graphics fragment represents a set of sampling points; and a graphics processing stage that receives graphics fragments for processing, the graphics processing stage having processing circuitry configured to:
  prior to performing a graphics processing operation for plural sampling points of a set of sampling points that a graphics fragment represents:
  read metadata associated with the plural sampling points, the metadata indicating whether or not the plural sampling points are associated with the same sample data value or values in a memory;
  determine from the metadata whether the plural sampling points are associated with the same sample data value or values in the memory; and if it is determined from the metadata that the plural sampling points are associated with the same sample data value or values, read only a single instance of the sample data value or values from the memory for use in the graphics processing operation.

It will be appreciated by those skilled in the art that the above embodiment of the technology described herein can, and in an embodiment does, include, as appropriate, any one or more or all of the optional features described herein.

For example, embodiments comprise determining from the metadata whether the graphics processing operation would, if performed in respect of each of the plural sampling points, produce the same result for each of the plural sampling points, and if it is determined that the graphics processing operation would produce the same result for each of the plural sampling points, performing only a single instance of the graphics processing operation for the plural sampling points to produce a result using the single instance of the sample data value or values, the single instance of the graphics processing operation being performed in respect of only one of the sampling points of the plural sampling points to produce the result using the single instance of the sample data value or values. Embodiments may comprise associating the result which is produced by the single instance of the graphics processing operation with each sampling point of the plural sampling points.

In any of the above embodiments of the technology described herein, the result that is associated with each of the plural sampling points (where that can be done) will depend upon the nature of the graphics processing operation (stage) in question.

For example, where the graphics processing operation (stage) is a culling test, such as a depth test, the result which is produced by the single instance of the graphics processing operation will and in an embodiment does comprise a decision to keep or discard the plural sampling points in question (to continue processing or to not further process the plural sampling points). Some embodiments therefore comprise, when associating the result which is produced by the single instance of the graphics processing operation with each sampling point of the plural sampling points, either removing the sampling points from, or retaining the sampling points for, further processing in the graphics processing pipeline as a result of that single instance of the graphics processing operation. These embodiments may comprise updating the coverage information (e.g. mask) for the fragment to indicate which sampling points in the fragment are to be processed for future processing of that fragment.

In some embodiments, all of the sampling points which the fragment represents may be removed or retained. In these embodiments, the result which is produced by the single instance of the graphics processing operation may be associated with the plural sampling points by either removing the fragment from further processing in the graphics processing pipeline (if the fragment is to be discarded) or retaining the fragment for further processing in the graphics processing pipeline (if the fragment is to be kept). Some embodiments therefore comprise, when associating the result which is produced by the single instance of the graphics processing operation with each sampling point of the plural sampling points, either removing the fragment from, or retaining the fragment in, the graphics processing pipeline as a result of that single instance of the graphics processing operation.

In some cases, where the result which is produced by the single instance of the graphics processing operation comprises one or more derived sample data values (e.g. a depth value, colour value (e.g. RGB value), and/or a transparency value (i.e. an alpha value)), the result which is produced by the single instance of the graphics processing operation and that is associated with the plural sampling points will and in an embodiment does comprise a sample data value or values. In these cases, the result which is produced by the single instance of the graphics processing operation is in an embodiment associated with the plural sampling points by storing one or more derived sample data values that are the result of the graphics processing operation for the sampling points in question (e.g. in a buffer, such as a tile buffer, colour buffer, depth buffer, stencil buffer, output buffer etc. (and as appropriate)) or updating the fragment data for the fragment. The stored or updated sample data value(s) may overwrite an existing sample data value or values for the plural sampling points. The stored or updated sample data value(s) may be reused (e.g. as the "fragment data" or "other sample data" discussed above) in later graphics processing operations. The stored or updated sample data value(s) may itself be overwritten or updated by later graphics processing operations.

In some circumstances (e.g. when writing to an output buffer), instances of the resultant sample data value(s) may be stored for each of the plural sampling points. However, in other circumstances (e.g. when writing to a tile buffer, colour buffer, depth buffer, stencil buffer, etc., or when the graphics processing operation includes a multisample resolve), a single instance of the resultant data value(s) may be stored for the plural sampling points. This can significantly reduce the amount of resources needed to store and/or write the resultant sample data value(s) of the graphics processing operation. Embodiments therefore comprise, when associating the result which is produced by the single instance of the graphics processing operation with each sampling point of the plural sampling points, storing only a single instance of the result for the plural sampling points. As discussed above, this may also comprise updating the metadata to indicate that the data value or values are the same for each of the plural sampling points.

In one embodiment, the graphics processing operation is a blending operation. In this embodiment, it is determined that the blending operation would produce the same data value(s) (e.g. colour value) for each of the plural sampling points by using coverage information for the fragment to determine that the plural sampling points will use the fragment data value(s) (e.g. colour value) that is associated with the fragment for the blending operation, and by using metadata to determine that other sample data value(s) (e.g. colour value) that is stored in a (e.g. tile or colour) buffer to be used in the blending operation is the same for each of the plural sample points. A single instance of the blending operation is then performed in respect one of the plural sampling points to derive the data value(s) using the fragment data value(s) and the other sample data value(s). The resultant data value(s) is then stored in a (e.g. tile or colour) buffer for each of the sampling point(s) and the metadata appropriately updated if necessary.

In another embodiment, the graphics processing operation is a depth test. In this embodiment, it is determined that the depth test would produce the same result (e.g. remove from further processing or keep for further processing) for each of the plural sampling points by using coverage information for the fragment to determine that the plural sampling points will use the fragment data value(s) (e.g. depth value) that is associated with the fragment for the depth test, and by using metadata to determine that other sample data value(s) (e.g. depth value) that is stored in a (e.g. tile or depth) buffer to be used in the depth test is the same for each of the plural sample points. A single instance of the depth test is then performed in respect one of the plural sampling points to derive the result using the fragment data value(s) and the other sample data value(s). The result(s) is then associated with each of the sampling point(s). Where the sampling points are kept for further processing, this may include updating the other data value(s) (e.g. depth value) stored in the (tile or depth) buffer with a resultant data value(s) (e.g. depth value) and the metadata appropriately updated if necessary. Where the sampling points are removed from further processing, this may include updating the coverage information for the fragment.

In one embodiment, the graphics processing operation includes a multisample resolve or "downsampling" (e.g. an averaging (and optional gamma correction and/or scaling) of the sample data values (e.g. colour values) stored in respect of plural sampling positions so as to produce an output data value (e.g. colour value), e.g. for a pixel which those plural sampling positions represent). In this embodiment, it is determined that the multisample resolve operation would produce the same output data value (e.g. colour value) in the case where the resolve operation is performed using sample data value(s) (e.g. colour values) stored in respect of each of the plural sampling positions being resolved as in the case where the resolve operation is performed using data value(s) (e.g. a colour value) stored in respect of only one of the plural sampling positions being resolved. This determination may be made using metadata to determine that sample data value(s) (e.g. colour value) that is stored in a (e.g. tile or colour) buffer to be used in the multisample resolve is the same for each of the plural sample positions. A single instance of the multisample resolve (e.g. scaling) is then performed in respect one of the plural sampling points to derive the output data value using the sample data value(s) (e.g. colour value). The output data value (e.g. colour value) is then associated with pixel in the output buffer. In some cases (e.g. where the multisample resolve is an averaging operation with no scaling), the multisample resolve may simply involve writing the data value (e.g. colour value) for one of the sampling positions of the pixel into the output buffer for that pixel.

It is believed that multisample resolve operations performed in this way are new and advantageous in their own right, and not merely in the context of the above described embodiments of the technology described herein.

Thus, an embodiment of the technology described herein comprises a method of performing multisample resolve operations to produce output data values for respective pixels, each pixel being represented in a graphics processing pipeline by plural sampling positions, the method comprising:

determining whether a multisample resolve operation would, if performed using data values stored in respect of plural sampling positions for a pixel, produce the same result if performed using a data value stored in respect of only one of the plural sampling positions for the pixel; and if it is determined that the multisample resolve operation would produce the same result if performed using a data value stored in respect of only one of the plural sampling positions for the pixel, performing the multisample resolve operation using only the data value stored in respect of said one of the sampling positions to produce the output data value for the pixel.

An embodiment of the technology described herein comprises a graphics processing pipeline comprising:

a graphics processing stage that performs multisample resolve operations to produce output data values for respective pixels, each pixel being represented in the graphics processing pipeline by plural sampling positions, the graphics processing stage having processing circuitry configured to:

determine whether a multisample resolve operation would, if performed using data values stored in respect of plural sampling positions for a pixel, produce the same result if performed using a data value stored in respect of only one of the plural sampling positions for the pixel; and if it is determined that the multisample resolve operation would produce the same result if performed using a data value stored in respect of only one of the plural sampling positions for the pixel, perform the multisample resolve operation using only the data value stored in respect of said one of the sampling positions to produce the output data value for the pixel.

In some embodiments, the multisample resolve operation, when performed using data values stored in respect of plural sampling positions for a pixel, includes (optionally gamma correction and/or scaling and) averaging of the data values stored in respect of the plural sampling positions for the pixel.

In some embodiments, the multisample resolve, when performed using a data value stored in respect of only one of the plural sampling positions for the pixel, may include (optionally gamma correction and/or scaling and) writing the data value stored in respect of only one of the plural sampling positions for the pixel to an output buffer for the pixel.

It will be appreciated by those skilled in the art that these embodiments of the technology described herein can, and in an embodiment do, include, as appropriate, any one or more or all of the optional features described herein.

Thus, for example, the determination that the multisample resolve operation would produce the same result if performed using a data value stored in respect of only one of the plural sampling positions for the pixel, may be made using metadata to determine that sample data values (e.g. colour values) that are stored in a (e.g. tile or colour) buffer to be used in the multisample resolve are the same for each of the plural sample positions.

As will be appreciated, it may not be possible to process some groups of plural sampling points at some stages of the graphics processing pipeline using only a single instance of a graphics processing operation for the plural sampling points in the manner discussed above. In this case, the sampling points are in an embodiment processed on a "per-sample" basis (i.e. in the conventional manner).

Thus, embodiments of the technology described herein may comprise, if it is not determined that the graphics processing operation would produce the same result for each of the plural sampling points, performing an instance of the graphics processing operation in respect of each of the plural sampling points at that stage of the graphics processing pipeline to produce a result for each of the plural sampling points. These embodiments may comprise associating the respective results which are produced by the instances of the graphics processing operation with each sampling point of the plural sampling points.

In this case, respective (different) result values may need to be associated with (e.g. updated or stored for) each of the plural sampling points. Embodiments may therefore comprise, when associating the respective results which are produced by the instances of the graphics processing operation with each sampling point of the plural sampling points, updating or storing a separate respective result value or values for each one of the plural sampling points individually. These embodiments accordingly may also comprise associating metadata with the plural sampling points, or updating metadata associated with the plural sampling points, so as to indicate that the resultant sample data values for the plural sampling points are not the same.

As in the technology described herein, only a single instance of the graphics processing operation in question may be required to produce the result for the plural sampling points, the Applicants have identified that, in graphics processing pipelines which are configured to be able to perform graphics processing operations on plural sampling points in parallel (e.g. using parallel graphics processing resources), it would be possible when performing only a single processing operation in the manner of the technology described herein to make use of the other (parallel) graphics processing resources for the stage of the graphics processing pipeline in question to process other sampling points (e.g. a second group of plural sampling points in the set of sampling points that are represented by the fragment or a second group of plural sampling points in a set of sampling points that are represented by another fragment) while the single processing operation is being performed (rather than, e.g. simply leaving those parallel processing resources idle). This provides for more efficient use of the graphics processing resources.

Thus, embodiments of the technology described herein comprise, in parallel with performing the (first) instance of the graphics processing operation to produce the result for the (first group of) plural sampling points using a first graphics processing resource, performing a second single instance of the graphics processing operation for a second group of plural sampling points to produce a second result using a second graphics processing resource.

The second group of plural sampling points may be processed in a similar manner to the processing of the first group of plural sampling points as discussed above. For example, embodiments of the technology described herein may comprise:

determining whether the graphics processing operation would, if performed at the stage of the graphics processing pipeline in respect of each of the second group of plural sampling points, produce the same result for each sampling point of the second group of plural sampling points;

if it is determined that the graphics processing operation would produce the same result for each sampling point of the second group of plural sampling points, performing only the second single instance of the graphics processing operation for the second group of plural sampling points at that stage of the graphics processing pipeline to produce the second result, the second single instance of the graphics processing operation being performed in respect of only one of the sampling points of the second group of plural sampling points to produce the second result; and associating the second result which is produced by the second single instance of the graphics processing operation with each sampling point of the second group of plural sampling points.

Embodiments of the technology described herein may be extended to circumstances where more than two instances of the graphics processing operation are respectively performed in parallel for groups of plural sampling points using respective graphics processing resources.

Although the technology described herein has been described above primarily with reference to the processing of a particular graphics fragment, as will be appreciated by those skilled in the art, this operation is in an embodiment performed for and in respect of plural graphics fragments (and in an embodiment each graphics fragment) that the rasteriser generates and/or the processing stage receives for processing. Similarly, as a render output to be generated by the graphics processing pipeline will typically be made up of plural primitives (and tiles in a tile-based system), in practice the method of the technology described herein will be repeated for each primitive (and tile) making up the output, so that eventually an appropriate set of rendered fragment data has been generated for each sampling point of the output that is needed.

Where the graphics processing is using multiple render targets, then in an embodiment, the operation in the manner of the technology described herein is done independently per render target (i.e. such that for a given render target, each fragment and pixel will be treated independently of the corresponding fragments and pixels in the other render targets, i.e. such that a particular pixel can have multiple values in one render target, but a single value in another render target).

The technology described herein can be used for all forms of output that a graphics processing pipeline may be used to generate, such as frames for display, render-to-texture outputs, etc.

In some embodiments, the graphics processing pipeline comprises, and/or is in communication with, one or more memories and/or memory devices that store the data described herein, such as the fragment data, other sample data, metadata etc., and/or store software for performing the processes described herein. The graphics processing pipeline may also be in communication with a host microprocessor, and/or with a display for displaying images based on the data generated by the graphics processor.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately configured dedicated hardware elements or processing circuitry, and/or programmable hardware elements or processing circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, if desired.

The technology described herein is applicable to any form or configuration of graphics processing pipeline and to all forms of rendering, such as immediate mode rendering, deferred mode rendering, tile-based rendering, etc. It is particularly applicable to graphics renderers that use deferred mode rendering and in particular to tile-based renderers.

Thus the technology described herein extends to a graphics processor and to a graphics processing platform including the apparatus of or operated in accordance with any one or more of the embodiments of the technology described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a field programmable gate array (FPGA), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk.

It will further be appreciated that not all steps of the methods of the technology described herein need be carried out by computer software and thus a further broad embodiment of the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

An embodiment of the technology described herein will now be described in the context of the processing of computer graphics for display.

As is known in the art, and as discussed above, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

The present embodiment is particularly concerned with anti-aliasing operations when, inter alia, displaying computer graphics images. As is known in the art, anti-aliasing is carried out by taking plural samples of an image to be displayed and then downsampling those samples to the output resolution of the display.

Figure 3:
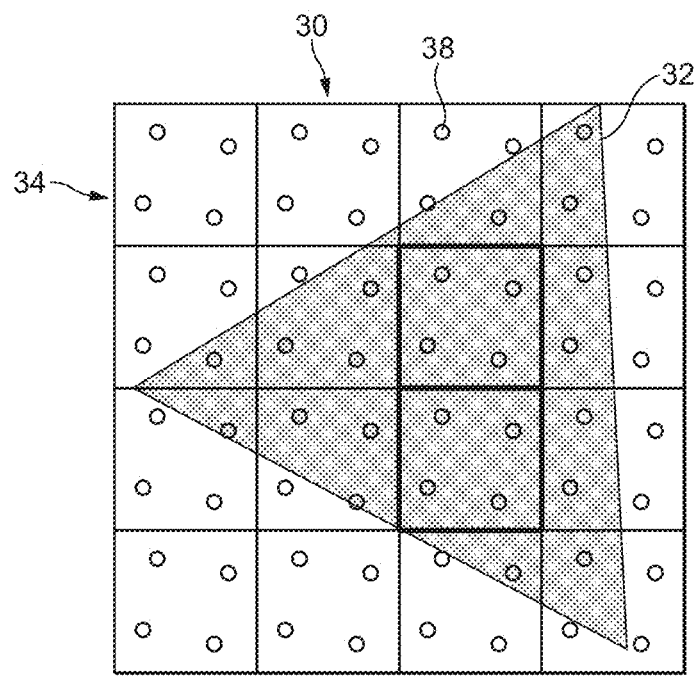
FIG. 3 shows schematically an image to be displayed.

FIG. 3, which shows schematically the basic anti-aliasing arrangement that is used in the present embodiment, shows the repeated application of a sampling mask 34 to an image to be displayed. Each application of the sampling mask 34 corresponds to a pixel of the image as it will be displayed.

Each sampling mask includes, as is known in the art, a set of sampling points 36 that will be used to sample the image for the output pixel in question and accordingly determine how the pixel is to be displayed on the final display.

Figure 4:
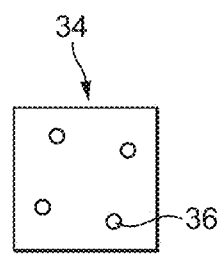
FIG. 4 shows an exemplary sampling pattern for use in an embodiment of the technology described herein.

In the present embodiment, each instance of the sampling mask 34 has 4 sampling points 36. FIG. 4, which shows an isolated view of the sampling mask 34, illustrates this. FIG. 4 shows a 4× sampling mask 34 which represents an array of 4 sampling points 36 which correspond to four sampling positions 38 for a given pixel of a render output to be generated. As will be discussed further below, in the present embodiment an image is processed using the 4× sampling mask 34 shown in FIG. 4.

FIG. 3 also shows an image overlaid on the sampling mask array 30 in the form of a single primitive 32. It will be appreciated here that the image has been shown in FIG. 3 as comprising a single primitive for simplicity. In practice the image (or other output) may and typically will comprise many, overlapping, primitives, as is known in the art. As can be seen from FIG. 3, the primitive 32 overlies some of the sampling masks in the sampling mask array 30 completely (outlined in bold), but only passes through part of some of the other sampling masks.

To process the primitive 32 of the image, the rendering system will, in essence, determine at the rasterisation stage which of the sample points in each set of sample points of each sampling mask application are covered by the primitive 32, and then render and store data for those covered sample points so that the image of the primitive 32 can be properly displayed on the display device.

The processing of the image of the primitive 32 for display in this manner in the present embodiment will now be described with reference to FIG. 5 which shows schematically a graphics processing pipeline 1 that may operate in accordance with the technology described herein.

Figure 5:
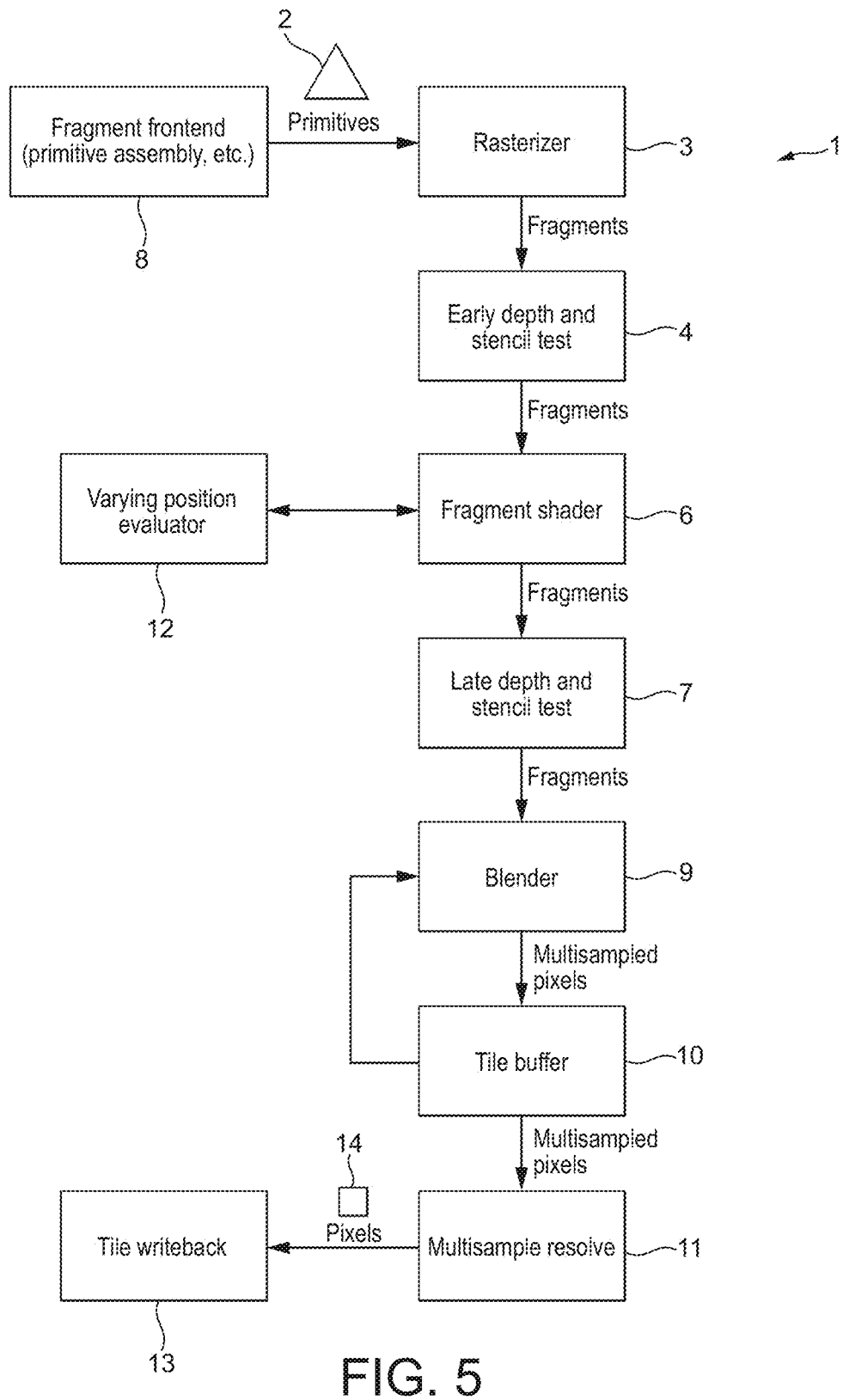
FIG. 5 shows an embodiment of a graphics processing pipeline that can be operated in accordance with the technology described herein.

The graphics processing pipeline 1 shown in FIG. 5 is a tile-based renderer and thus will, as is known in the art, produce tiles of a render output data array, such as an output frame to be generated. As will be appreciated by those skilled in the art, other rendering arrangements can be used, if desired.

As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may, as is known in the art, typically be an output frame intended for display on a display device, such as a screen or printer, but may also, for example, comprise intermediate data intended for use in later rendering passes (also known as a "render to texture" output), etc.

FIG. 5 shows the main elements and pipeline stages of the graphics processing pipeline 1 that are relevant to the operation of the present embodiment. As will be appreciated by those skilled in the art there may be other elements of the graphics processing pipeline that are not illustrated in FIG. 5. It should also be noted here that FIG. 5 is only schematic, and that, for example, in practice the shown functional units and pipeline stages may share significant hardware circuits, even though they are shown schematically as separate stages in FIG. 5. It will also be appreciated that each of the stages, elements and units, etc., of the graphics processing pipeline as shown in FIG. 5 may be implemented as desired and will accordingly comprise, e.g., appropriate circuitry and/or processing logic, etc., for performing the necessary operation and functions.

FIG. 5 shows schematically the pipeline stages after the graphics primitives (polygons) 2 for input to the rasterisation process have been generated. Thus, at this point the graphics data (the vertex data) has undergone fragment frontend operations 8, such as transformation and lighting operations (not shown), and a primitive set-up stage (not shown) to set-up the primitives to be rendered, in response to the commands and vertex data provided to the graphics processor, as is known in the art.

As shown in FIG. 5, this part of the graphics processing pipeline 1 includes a number of stages, including a rasterisation stage 3, an early Z (depth) and stencil test stage 4, a fragment shading stage 6, a late Z (depth) and stencil test stage 7, a blending stage 9, tile buffers 10 and a downsampling and writeback (multisample resolve) stage 11.

The rasterisation stage 3 of the graphics processing pipeline 1 operates, as is known in the art, to rasterise the primitives making up the render output (e.g. the image to be displayed) into individual graphics fragments for processing. To do this, the rasteriser 3 receives graphics primitives 2 for rendering, rasterises the primitives to sampling points and generates graphics fragments having appropriate positions (representing appropriate sampling positions) for rendering the primitives.

In the present embodiment, the rasteriser is a hierarchical rasteriser that operates to iteratively test primitives against progressively smaller patches of fragments. It operates by starting with a large patch of the output area and testing if the primitive in question is inside that patch. If not, the entire patch is discarded, and the next patch tested, and so on. On the other hand, if a primitive is found to be within the patch (to be covered, at least in part, by the patch), the patch is divided into 4 parts, each such "sub-patch" is then tested in the same way, and so on, until a minimum patch size is reached (which in the present embodiment is a 2×2 group of sampling masks (i.e. corresponds to a 2×2 group of fragments) (but which could, e.g., be an individual sample, an individual sampling mask (fragment), or a different sized group of sampling masks (fragments)).

As in this embodiment the smallest patch size contains plural sampling points (i.e. is a 2×2 group of sampling masks (fragments)), the individual sampling points in the final patch are then tested using a separate sample tester. In the present embodiment, this sample tester of the rasteriser 3 is configured to be able to test sampling masks containing four sampling points per clock cycle (i.e., in effect, to test the set of four sampling points that will be associated with a fragment that would be generated for the set of four sampling points if at least one of them is within the primitive).

This "hierarchical" rasterisation mechanism allows the rasteriser to quickly discard empty patches (and accordingly to focus quickly on the parts of a tile where a primitive actually occurs).

As will be discussed in more detail below, the rasteriser generates a fragment for each application of the sampling mask found to include the primitive. These fragments are then sent onwards to the rest of the pipeline for processing.

The early Z/stencil stage 4 performs, is known in the art, a Z (depth) test on fragments it receives from the rasteriser 3, to see if any fragments can be discarded (culled) at this stage. To do this, it compares the depth values of (associated with) fragments issuing from the rasteriser 3 with the depth values of fragments that have already been rendered (these depth values are stored in a depth (Z) buffer that is part of the tile buffers 10) to determine whether the new fragments will be occluded by fragments that have already been rendered (or not). At the same time, an early stencil test is carried out. The early depth and stencil testing stage 4 may be configured to be able to perform a single depth and stencil test per clock cycle, and thus may perform a series of four "per-sample" depth and stencil tests to process the sampling points of a fragment. Alternatively, the early depth and stencil testing stage 4 may be configured to be able to perform four depth and stencil tests per clock cycle, and thus may perform, in parallel, four "per-sample" depth and stencil tests to process the sampling points of a fragment.

Fragments that pass the fragment early Z and stencil test stage 4 are then sent to the fragment shading stage 6. The fragment shading stage 6 performs the appropriate fragment processing operations on the fragments that pass the early Z and stencil tests, so as to process the fragments to generate the appropriate fragment data, etc., for the render output (e.g. for display of the fragments), as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 6 is in the form of a shader pipeline (a programmable fragment shader), but other arrangements, such as the use also or instead of fixed function fragment shading units would be possible, if desired. The fragment shader 6 is configured to always process all the sampling points associated with a fragment that it receives as a whole.

The fragment shading stage 6 has associated with it a varying interpolator (a varying position evaluator) 12 which is used to determine the correct varying value for the current fragment. For certain interpolation modes, such as centroid mapping, the varying interpolator uses the fragment's associated coverage mask to select the correct position within the fragment to interpolate the varying data for. Thus, the varying interpolator 12 is configured to be able to process all the sampling points associated with a fragment that it receives in parallel, so as to be able to select the correct interpolation position for centroid mapping.

There is then a "late" fragment Z and stencil test stage 7, which carries out, inter alia, an end of pipeline depth test on the shaded fragments to determine whether a rendered fragment will actually be seen in the final image. This depth test uses the Z-buffer value for the fragment's position stored in the Z-buffer in the tile buffers 10 to determine whether the fragment data for the new fragments should replace the fragment data of the fragments that have already been rendered, by, as is known in the art, comparing the depth values of (associated with) fragments issuing from the fragment shading stage 6 with the depth values of fragments that have already been rendered (stored in the depth buffer). This late fragment depth and stencil test stage 7 also carries out any necessary "late" alpha and/or stencil tests on the fragments. The late depth and stencil testing stage 7 may be configured to be able to perform a single depth and stencil test per clock cycle, and thus may perform a series of four "per-sample" depth and stencil tests to process the sampling points of a fragment. Alternatively, the late depth and stencil testing stage 7 may be configured to be able to perform four depth and stencil tests per clock cycle, and thus may perform, in parallel, four "per-sample" depth and stencil tests to process the sampling points of a fragment.

The fragments that pass the late fragment test stage 7 are then subjected to, if required, any necessary blending operations with fragments already stored in the tile buffers 10 in the blender 9. Any other remaining operations necessary on the fragments, such as dither, etc. (not shown) are also carried out at this stage. The blender 9 may be configured to be able to perform a single blending operation per clock cycle, and thus may perform a series of four "per-sample" blending operations to process the sampling points of a fragment. Alternatively, the blender 9 may be configured to be able to perform four blending operations per clock cycle, and thus may perform, in parallel, four "per-sample" blending operations to process the sampling points of a fragment.

Finally, the (blended) output fragment data (values) are written to the tile buffers 10 from where they can, for example, be output to a frame buffer for display. The depth value for an output fragment is also written appropriately to a Z-buffer within the tile buffers 10. The tile buffers and Z-buffer will thus store appropriate colours, etc., or Z-values for the sampling points that the buffers represent. The tile buffers store an array of sample data that represents part of the render output (e.g. image to be displayed).

In the present embodiment, three tile buffers are provided. Each tile buffer stores its sample data in a 32×32 array (i.e. corresponding to a 32×32 array of sample positions in the output to be generated, e.g., in the image to be displayed). Each 32×32 data position tile buffer can accordingly correspond to (and will support) a 16×16 pixel "tile" of, e.g., the frame to be displayed, at 4× anti-aliasing (i.e. 4 samples per pixel).

These tile buffers may be provided as separate buffers, or may in fact all be part of the same, larger buffer. They are located on (local to) the graphics processing pipeline (chip).

In this embodiment, two of the three tile buffers are used to store colour (red, green, blue) values for each sampling point (it would be possible to use one tile buffer for this purpose), and one tile buffer is used to store Z (depth) values and stencil values for each sampling point. Other arrangements would, of course, be possible.

The data from the tile buffers 10 is input to a downsampling (multisample resolve) unit 11, and thence output (written back) to an output buffer 13 (that may not be on the graphics processing platform itself), such as a frame buffer of a display device (not shown). The display device could comprise, e.g., a display comprising an array of pixels, such as a computer monitor or a printer.

The downsampling unit 11 downsamples the sample data stored in the tile buffers 10 to the appropriate resolution for the output buffer (device) (i.e. such that an array of pixel data corresponding to the pixels of the output device is generated), to generate output values (pixels) 14 for output to the output buffer 13.

The downsampling unit 11 in the graphics processing pipeline 1 in the present embodiment is configured to be able to, in one downsampling operation (clock cycle), downsample four sample position values from the tile buffer 10 to a single output value, e.g. for output to the output buffer 13. Thus the downsampling and writeback unit 11 is configured, in the present embodiment, to natively support 4× anti-aliasing (4×MSAA).

This downsampling can take place in any suitable manner. In the present embodiment linear blending of the data is used to downsample it. However, other arrangements would be possible, if desired. If needed, the downsampling unit 11 may also apply appropriate gamma correction to the data that it outputs to the output buffer 13, or this may be done, e.g., as a fragment shading operation, or in any other suitable and desired manner.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed).

Other arrangements for the graphics processing pipeline 1 would, of course, be possible.

The operation of the graphics processing pipeline shown in FIG. 5 in accordance with an embodiment of the technology described herein will now be described.

As 4×MSAA is being carried out, the rasteriser 3 will apply (test) sampling masks having four sample positions (i.e. 4× sampling masks) to the output to be generated, and associate each fragment that it generates for rendering with a set of four sample points corresponding to a given application of the sampling mask. In other words, a single fragment is used to render all four sample points of a set of sample points of a given application of the sampling mask (and accordingly of a pixel in the output) together in one go.

Thus, in the present example, considering the image comprising the primitive 32 shown in FIG. 3, the rasteriser 3 will receive that primitive from the fragment frontend processing stages 8 of the graphics processing system, and then determine which sets of sampling points of the image (i.e. in effect which applications of the sampling mask 34 in the array 30) include sampling points that are covered by the primitive 32. (This may be carried out in any appropriate manner known in the art.) The rasteriser 3 will then generate a fragment for each application of the sampling mask found to include a sampling point that is covered by the primitive 32. Thus, the rasteriser 3 will generate fragments associated with sets of four sampling points. It will then output those fragments to the later stages of the graphics processing pipeline 1 for processing.

Figure 6:
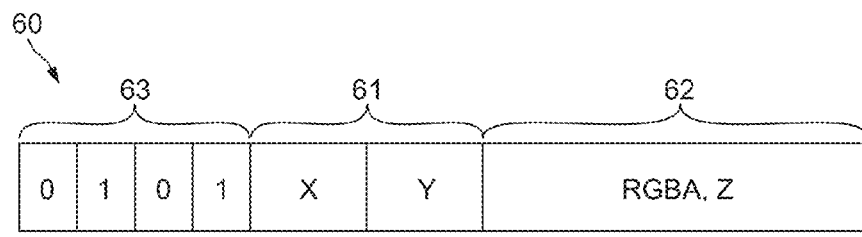
FIG. 6 illustrates the data that is associated with the sampling points of a fragment to be rendered in an embodiment of the technology described herein.

FIG. 6 shows schematically the data 60 that is generated for and associated with each fragment generated by the rasteriser 3. As shown in FIG. 6, the data that is associated with each fragment includes, inter alia, the x,y position 61 of the fragment (which represents the x,y position in the image of the set of sampling points (the application of the sampling mask) that the fragment corresponds to (in practice in the present embodiment of the relevant pixel in the output frame)), together with the necessary per fragment data 62, such as the colour (RGB), transparency (alpha), depth (z) and stencil values for the fragment. This per fragment data 62 is, as is known in the art, used by and appropriately modified by the later processing stages of the graphics processing pipeline 1 to provide the output set of fragment data for the fragment that is then stored in the tile buffers 10. FIG. 6 shows a single depth (Z) value for the fragment. It would instead be possible, e.g., to have or calculate a separate depth (Z) value for each sampling position associated with the fragment, if desired.

The data 60 that is associated with the fragment also includes coverage information (a coverage mask) 63 that is in the form of a bit array representing each of the sample positions within the set of sample points (the sample mask) that the fragment is associated with and corresponds to. Each position in the bit array coverage mask 63 is set to "1" if the corresponding sample position is found to be covered by the primitive in question at the rasterisation stage, and to "0" if the sample position is not covered by the primitive in question. This allows the rendering process to know which of the sample points associated with a given fragment are in fact covered by the primitive in question, so that the rendering process can ensure that the rendered fragment data for a fragment is only used (and, e.g. stored) for the sample points that are covered by the primitive. This is necessary, because, as can be seen from FIG. 3, not all the sampling points of a set of sampling points for an application of the sampling mask 34 will necessarily be covered by a primitive.

In the present embodiment, as shown in FIG. 6, each fragment that is generated by the rasteriser is associated with a 4 bit coverage mask 63. The coverage mask 63 associated with each fragment 60 contains 4 bits to allow for the set of four sampling points that will be associated with the fragment when carrying out 4×MSAA.

Thus, when carrying out 4×MSAA, when the rasteriser 3 receives a primitive for rendering, it will firstly determine which sets of four sampling points (sampling masks) of the sampling point array corresponding to respective pixels of the output include sampling points that are covered by the primitive, and for each of those sets of four sampling points, generate a fragment having associated with it data of the form shown in FIG. 6.

It will also set the 4 bits of the coverage mask 63 for the fragment to "1" or "0", depending upon how many and which ones of the set of four sampling positions associated with the fragment are covered by the primitive in question.

For example, if the primitive only covers two of the four sample positions associated with the fragment, the rasteriser 3 will generate a coverage mask 63, e.g., of the form shown in FIG. 6, in which the 4 bits of the coverage mask 63 are set to indicate that two of the four sample positions are being rendered by the fragment 60, but that the other two sample positions are not being rendered by the fragment (since they are not covered by the primitive in question). If the primitive covers all four of the sample positions associated with the fragment, the rasteriser 3 will generate a coverage mask 63 in which the 4 bits of the coverage mask 63 are set to indicate all four of the sample positions are being rendered by the fragment 60 (are "covered" by the primitive in question).

Each such fragment will then be output (passed onwards) to the rest of the graphics processing pipeline 1 for processing, as shown in FIG. 5.

The fragments output by the rasteriser 3 are first subjected to early depth and stencil tests in the early depth and stencil testing stage 4. As the early depth and stencil testing stage 4 is configured, as discussed above, to be able to test four sample points (either in series or in parallel), it can test all the sampling points associated with each 4×MSAA fragment that it receives using plural "per-sample" tests respectively performed on each of the sampling points. However, as will be discussed below, in the present embodiment under some circumstances, the early depth and stencil test may be performed as a single test on one of the sampling points, with the result of that single test then being associated with each of the sampling points.

The early depth and stencil testing stage 4 then outputs the so-tested fragments to the fragment shader 6.

The fragment shader 6 is configured, as discussed above, to process (shade) all the sampling points of each fragment that it receives for processing in parallel, as is the varying interpolator (varying position evaluator) 12 (where that is needed).

The shaded fragments are then subjected to a late depth and stencil test by the late depth and stencil test stage 7. As for the early depth and stencil test stage 4, because late depth and stencil testing stage 7 is configured to be able to test four sample points (either in series or in parallel), it can test all the sampling points associated with each 4×MSAA fragment that it receives using plural "per-sample" tests respectively performed on each of the sampling points. However, as will be discussed below, in the present embodiment under some circumstances, the late depth and stencil test 7 may be performed as a single test on one of the sampling points, with the result of that single test then being associated with each of the sampling points.

The late depth and stencil testing stage 7 then outputs the so-tested fragments to the blender 9.

The blender 9 then blends the fragments it receives appropriately with corresponding fragment data already stored in the tile buffer 10. As the blender 9 is able to blend four sample points (either in series or in parallel), it can blend all the sampling points associated with each 4×MSAA fragment that it receives using plural "per-sample" blending operations respectively performed on each of the sampling points. However, as will be discussed below, in the present embodiment under some circumstances, the blending may be performed as a single blending operation for one of the sampling points, with the result of that single blending operation then being associated with each of the sampling points.

Figure 7A:
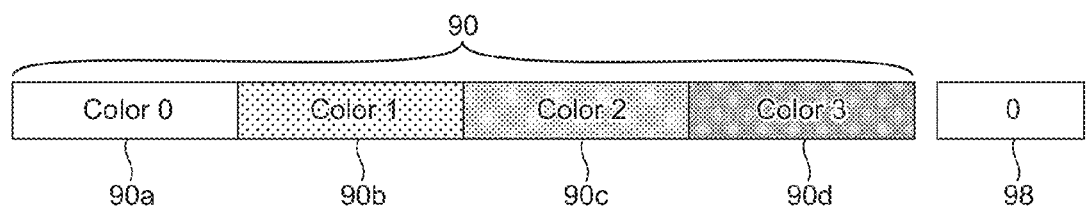
FIGS. 7a and 7b illustrate sample data that is associated with the sampling positions to which a fragment to be rendered corresponds in an embodiment of the technology described herein.
Figure 7B:
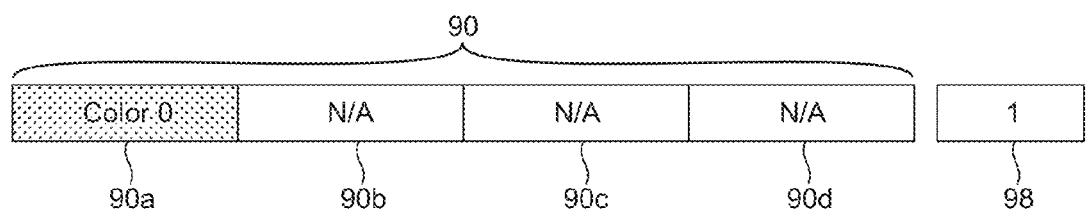

FIGS. 7a and 7b show schematically the format of the sample data 90 that is stored for each group of four sampling positions that correspond to respective pixels of the render output in the tile buffer 106 in the present embodiment.

As shown in FIGS. 7a and 7b, for each set of four sampling positions corresponding to a given output pixel, sample data 90a is provided for a first sampling position corresponding to a first sampling position of the pixel, sample data 90b is provided for a second sampling position corresponding to a second sampling position of the pixel, sample data 90c is provided for a third sampling position corresponding to a third sampling position of the pixel, and sample data 90d is provided for a fourth sampling position corresponding to a fourth sampling position of the pixel.

In this embodiment, the sample data for each sampling position includes the colour (RGB) and transparency (alpha) values for that sampling position.

In this embodiment, as shown in FIGS. 7a and 7b, as well as the sample data 90a-d, each such set of four sampling positions in the tile buffer 10 also has metadata 98 associated with it in the tile buffer 10. This metadata 98 is in the form of a bit which indicates whether or not the sample data for the four sampling positions should be taken to be the same for all of the sampling positions in the set of four sampling positions associated with the metadata 98. The bit is set to "1" if the sample data should be taken to be the same for all of the sampling positions, and to "0" if the sample data should not be taken to be the same for all of the sampling positions.

FIG. 7a illustrates the situation where the sample data 90a-d is not the same for all of the sampling positions, and so the metadata 98 is set to "0" to indicate this. FIG. 7b illustrates the situation where the sample data should be taken to be the same for all of the sampling positions, and so the metadata 98 is set to "1" to indicate this. In this case, since theسample data should be taken to be the same for all of the sampling positions, and this is indicated by the metadata 98, as shown in FIG. 7b only sample data 90a for the first sampling position needs to contain valid data. This valid data is then re-used in respect of graphics processing for the other sampling positions.

In other embodiments, the metadata 98 may comprise plural bits, for example with a respective bit for each sampling position, the plural bits indicating (e.g. with a "1") for which sampling positions the sample data may be considered to be the same.

The metadata 98 facilitates operation in the manner of the technology described herein. This will now be illustrated with reference to the operation of the blender 9 when applying blending to a fragment being rendered.

This operation of the blender 9 when blending a fragment will now be described with reference to FIGS. 9 and 10a-h.

Figure 9:
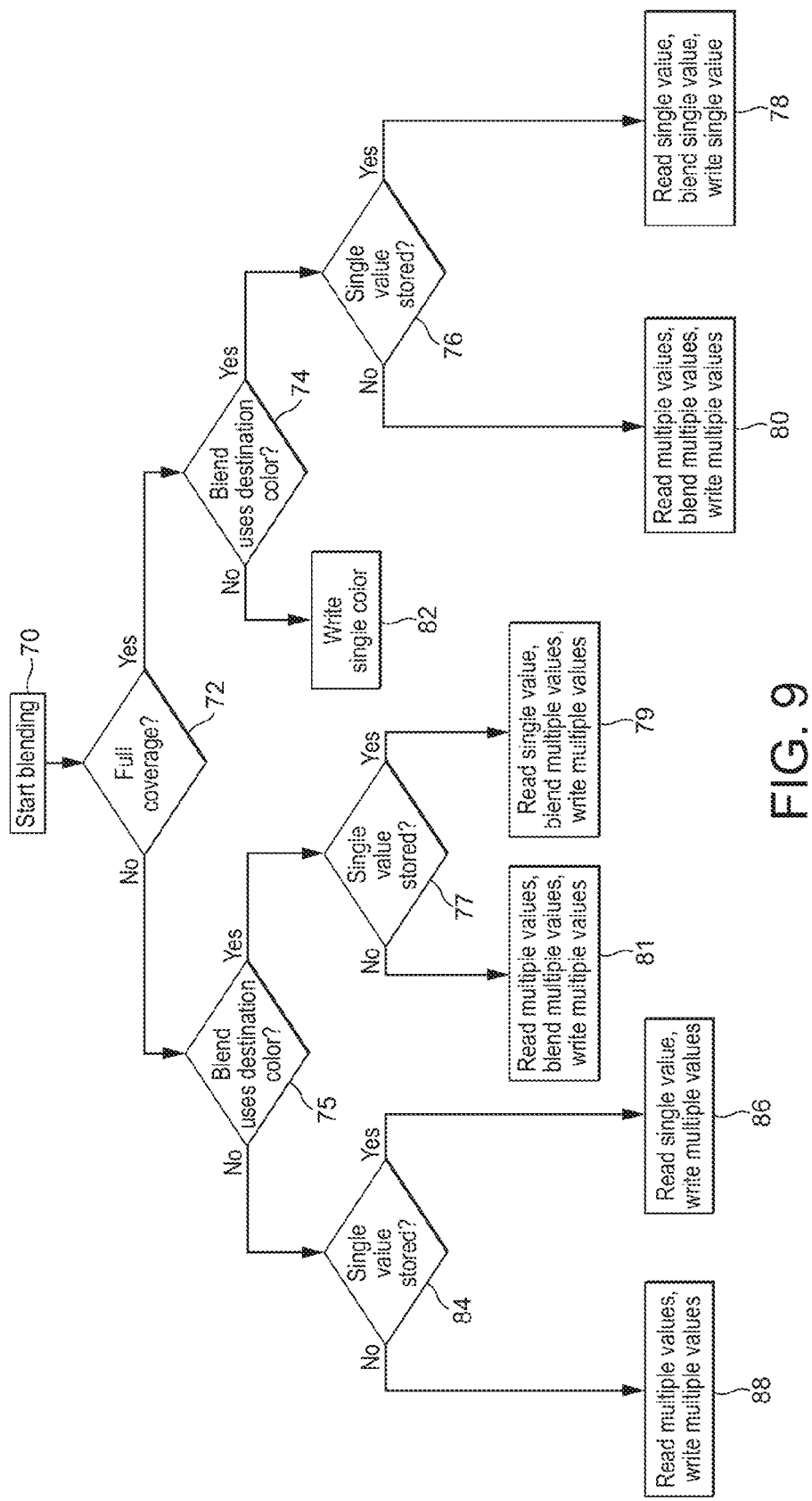
FIG. 9 shows an exemplary flow diagram for determining the manner in which to process a fragment in an embodiment of the technology described herein.

FIG. 9 shows a flow diagram for selecting the manner in which to operate the blender 9 for a given fragment, and FIGS. 10*a*-*h* schematically illustrate various ways in which to then process that fragment.

Referring to FIG. 9, blending of a fragment begins at step 70. At step 72, it is determined from the coverage mask for the fragment whether or not all of the sampling points of the fragment are to be rendered using that fragment (i.e. whether or not all the sampling points for the fragment are "covered" by the primitive in question). For example, for each of the fragments derived from the sample masks outlined in bold in FIG. 3, it will be determined that all the sampling points of that fragment are to be blended for the primitive 32 when processing that fragment.

If the determination at step 72 is positive, then it is determined at step 74 whether or not the blending operations for the sampling points of the fragment are dependent on (i.e. use) sample data (e.g. colour data) which has been previously generated and stored in the tile buffer in respect of the sampling positions to which the sampling points of the fragment correspond.

The determination at step 74 may be made by considering the blending equation to be used in the blending operation. For example, if the blending equation includes a calculation based on the previous sample data, then it may be determined that the blending operations for the sampling points of the fragment are dependent on the previous sample data. However, if the blending equation simply replaces the previous sample data in some way (e.g. with the fragment data), then it may be determined that the blending operations for the sampling points of the fragment are not dependent on the previous sample data.

The determination at step 74 may also or instead be made by considering the alpha (transparency) value for the fragment. If the alpha value indicates partial opacity (partial transparency), then it may be determined that the blending operations for the sampling points of the fragment are dependent on the previous sample data (since previous primitives may be "seen" through the primitive currently being processed). If the alpha value indicates full opacity (no transparency), then it may be determined that the blending operations for the sampling points of the fragment are not dependent on the previous sample data (since previous primitives cannot be "seen" through the primitive currently being processed).

If the determination at step 74 is positive, then it is determined at step 76 whether or not the sample data which has been previously generated and stored in the tile buffer in respect of the sampling positions of the sampling points of the fragment is the same for all of the sampling positions. In the present embodiment, this determination is made by reading the stored metadata 98 for the tile buffer 10 which indicates whether or not the set of sampling positions to which the fragment corresponds are associated with the same sample data values in the tile buffer 10 (i.e. whether or not the sample data which has been previously generated and stored in the tile buffer in respect of the sampling positions to which the fragment corresponds is the same for all of the sampling positions).

If the determination at step 76 is positive, then it can be surmised that the blending operation, if performed in respect of each of the sampling points of the fragment, would produce the same result for each of the sampling points of the fragment. Accordingly, at step 78, a single instance of the sample data which has been previously generated and stored in the tile buffer in respect of the sampling positions to which the fragment corresponds is read from the tile buffer. A single blending operation is then performed in respect of one of the sampling points of the fragment using the data read from the tile buffer, and then a single instance of the result of the blending operation is written to the tile buffer for the sampling points (and sampling positions) in question.

Figure 10A:
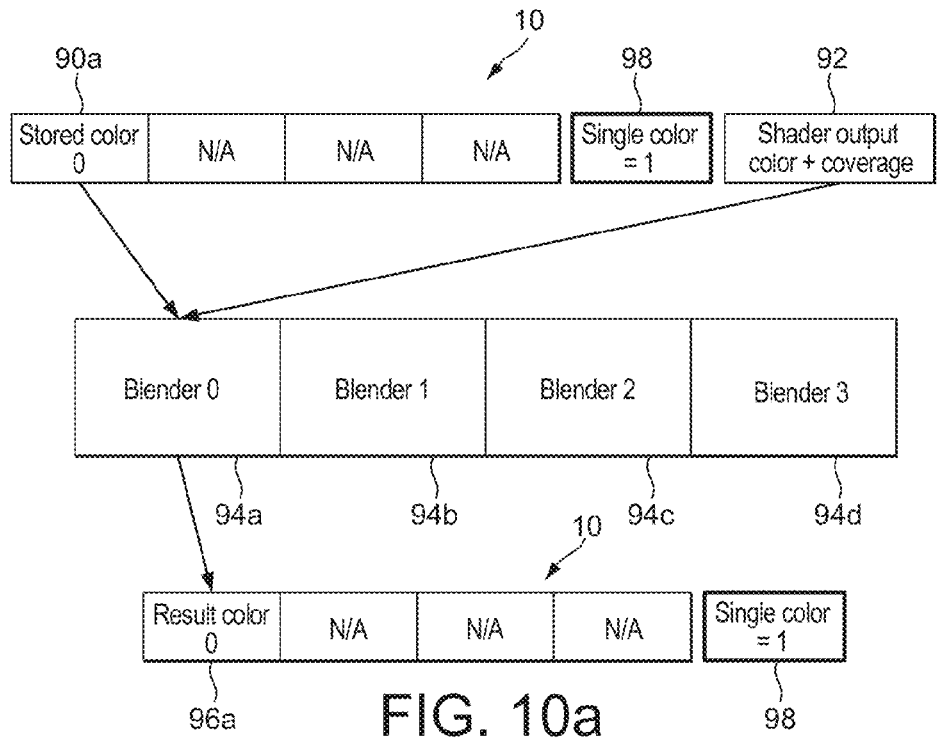
FIGS. 10a-h show schematically various ways in which to process a fragment in embodiments of the technology described herein.

FIG. 10*a* schematically illustrates step 78 of FIG. 9. FIG. 10*a* shows a portion of the tile buffer 10 which contains a single instance of previously stored sample data 90*a* which is valid for the sampling positions to which the fragment corresponds. FIG. 10*a* also shows metadata 98, which indicates that the previously stored sample data 90*a* is the same for each of the sampling positions to which the fragment corresponds.

FIG. 10*a* shows that the single instance of previously stored data 90*a* is read from tile buffer 10, and is blended using fragment data 92 for the sampling points in a first blender 94*a*. The result 96*a* generated by the first blender 94*a* is then stored in the tile buffer 10. Metadata 98 for the data stored in the tile buffer remains the same to indicate that the resultant data which is stored in the tile buffer 10 for the sampling positions to which the fragment corresponds is still the same for all of the sampling positions. It should be noted that second 94*b*, third 94*c* and fourth 94*d* blenders are not needed to blend the sampling points in step 78, and so the amount of processing resources needed to blend the sampling points when compared to conventional arrangements is reduced.

Referring again to FIG. 9, if the determination at step 76 is negative, then it can be surmised that the blending operation, if performed in respect of each of the sampling points of the fragment, would not necessarily produce the same result for each of the sampling points of the fragment. Accordingly, at step 80, the different data which has been previously generated and stored in the tile buffer in respect of the sampling positions to which the fragment corresponds is read from the tile buffer. A blending operation is then performed in respect of each of the sampling points of the fragment using the different data read from the tile buffer, and the results of the blending operations are then written to the tile buffer for the sampling positions in question.

Figure 10B:
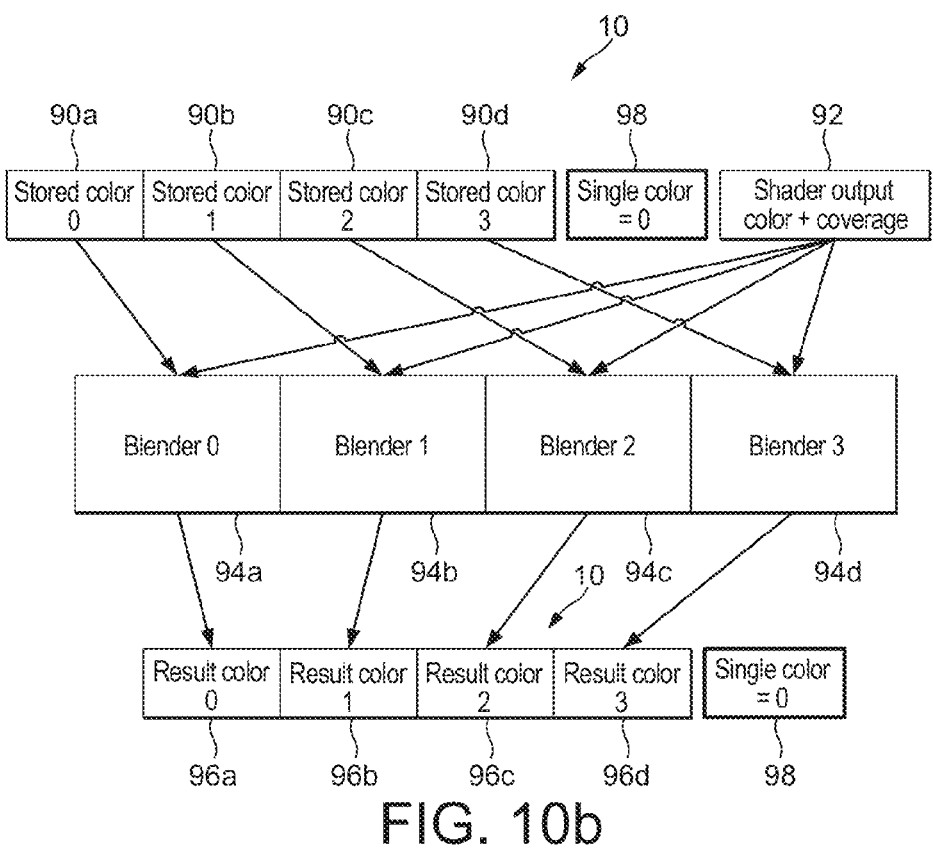

FIG. 10*b* schematically illustrates step 80 of FIG. 9. FIG. 10*b* shows a portion of the tile buffer 10 which contains respective (different) previously stored sample data 90*a*-*d* for each of sampling positions to which the fragment corresponds. FIG. 10*a* also shows metadata 98, which indicates that the previously stored sample data 90*a* is not the same for each of the sampling positions to which the fragment corresponds.

FIG. 10*b* shows that respective previously stored data 90*a*-*d* for the sampling positions is read from tile buffer 10, and is blended using fragment data 92 in respective blenders 94*a*-*d*. The respective results 96*a*-*d* generated by the blenders 94*a*-*d* are then stored in the tile buffer 10 for the respective sampling positions. Metadata 98 for the data stored in the tile buffer remains the same so as to indicate that the resultant data which is stored in the tile buffer 10 in respect of the sampling positions to which the fragment corresponds is still not the same for all the sampling positions.

Referring again to FIG. 9, if the determination at step 74 is negative, then it can again be surmised that the blending operation, if performed in respect of each of the sampling points of the fragment, would produce the same result for each of the sampling points of the fragment. Accordingly, at step 82, a single blending operation is performed in respect of one of the sampling points of the fragment, and a single instance of the result of the blending operation is then written to the tile buffer for the sampling positions in question.

In some embodiments, there may be an additional step (similar to step 76 discussed above) prior to step 82, in which it is determined whether or not the data which has been previously generated and stored in the tile buffer in respect of the sampling positions to which the fragment corresponds is the same for all those sampling positions. This determination may be made by reading metadata for the sampling positions to which the fragment corresponds, as discussed above. This additional step can be used to decide whether or not the metadata 98 for the data stored in the tile buffer needs to be changed to indicate that the resultant data which is stored in the tile buffer 10 in respect of the sampling positions to which the fragment corresponds is the same for all the sampling positions. Alternatively, this additional step can be omitted and the metadata automatically refreshed regardless of its previous value so as to indicate that the resultant data which is stored in the tile buffer 10 in respect of the sampling positions to which the fragment corresponds is the same for all the sampling positions.

Figure 10C:
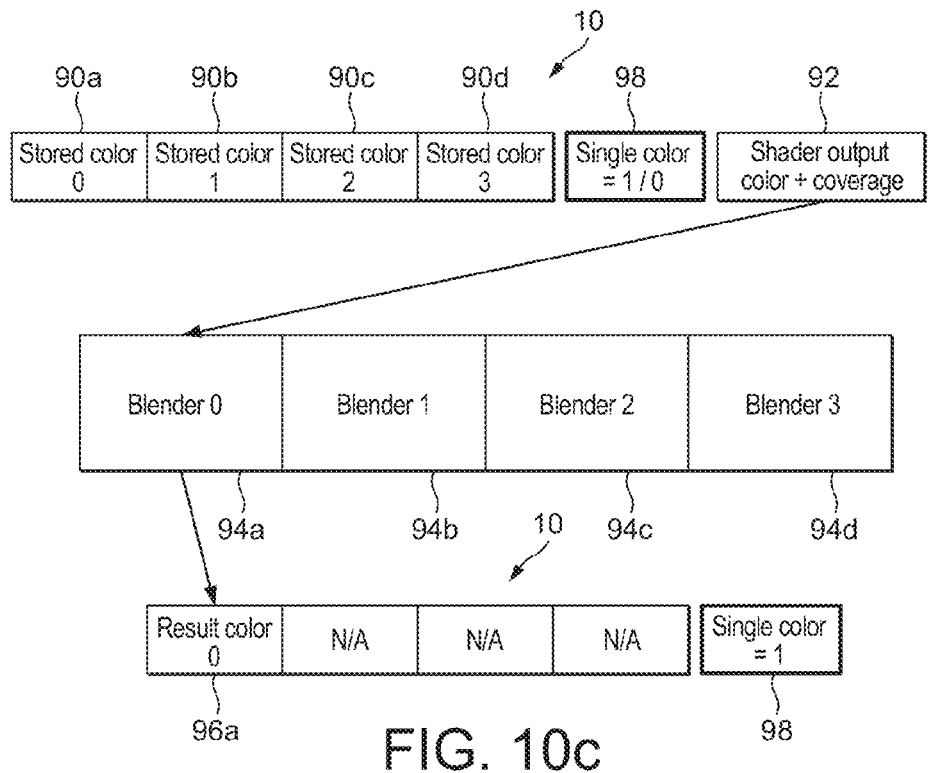

FIG. 10c schematically illustrates step 82 of FIG. 9. FIG. 10c shows that previously stored data 90a-d for the respective sampling positions is not read from tile buffer 10. Instead, fragment data 92 alone is processed in (or passed straight through) the first blender 94a. The result 96 generated by the first blender 94 (or fragment data passed through the first blender 94) is then stored in the tile buffer 10. Metadata 98 for the data stored in the tile buffer is then updated, if necessary, to indicate that the resultant data which is stored in the tile buffer 10 in respect of the sampling positions to which the fragment corresponds is the same for all the sampling points. It should again be noted that the second 94b, third 94c and fourth 94d blenders are not needed to process the sampling points in step 82, and so the amount of processing resources needed to blend the sampling points when compared to conventional arrangements is reduced.

Referring again to FIG. 9, if the determination at step 72 is negative, then it is again determined at step 75 whether or not the blending operations for the sampling points of the fragment are dependent on (i.e. use) data (e.g. colour data) which has been previously generated and stored in the tile buffer in respect of the sampling positions to which sampling points of the fragment correspond. This determination may again be made by considering the blending equation and/or alpha (transparency) value in the fragment data for the fragment, as discussed above.

If the determination at step 75 is positive, then it is determined at step 77 whether or not the data which has been previously generated and stored in the tile buffer in respect of the sampling positions to which the fragment corresponds is the same for all the sampling positions. This determination is again made by reading the tile buffer metadata 98 for the sampling positions to which the fragment corresponds, as discussed above.

If the determination at step 77 is positive, then at step 79 a single instance of the data which has been previously generated and stored in the tile buffer in respect of the sampling positions to which the fragment corresponds is read from the tile buffer. A blending operation is then performed in respect of each of the sampling points of the fragment using the single instance of data read from the tile buffer, and the results of the blending operations are then written to the tile buffer for the sampling positions in question.

Figure 10D:
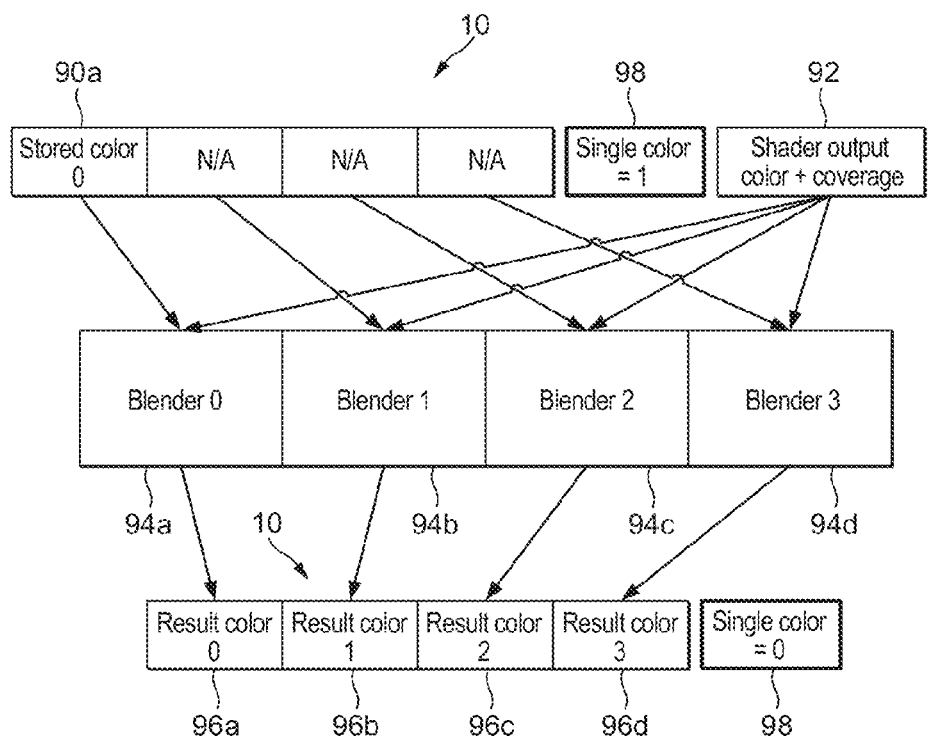

FIG. 10d schematically illustrates step 79 of FIG. 9. FIG. 10d shows that a single instance of previously stored data 90a is read from tile buffer 10, and is blended using fragment data 92 in respective blenders 94a-d. The respective results 96a-d generated by the blenders 94a-d are then stored in the tile buffer 10 for the respective sampling positions. Metadata 98 for the data stored in the tile buffer is updated so as to indicate that the resultant data which is stored in the tile buffer 10 in respect of the sampling positions to which the fragment corresponds is no longer the same for all the sampling positions. It should be noted that only a single tile buffer read operation (to access data 90a) is needed to blend the sampling points in step 79, and so the amount of read resources needed to blend the sampling points when compared to conventional arrangements is reduced.

Figure 10E:
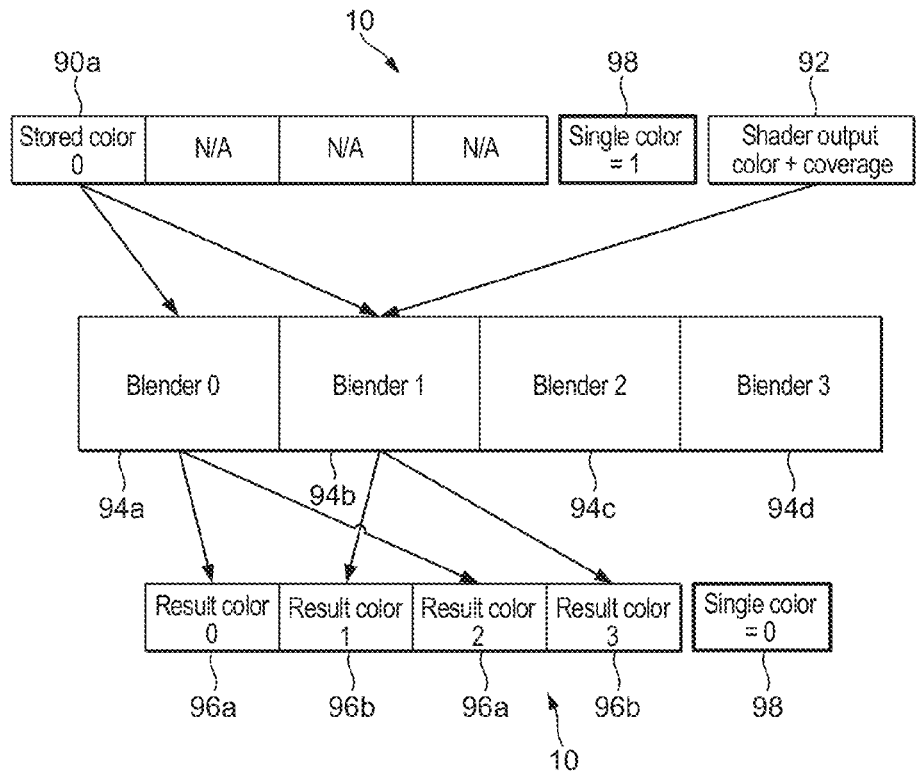

FIG. 10e schematically illustrates an alternative version of step 79 of FIG. 9. FIG. 10e shows that a single instance of previously stored data 90 is again read from tile buffer 10. The previously stored data is passed through a first blender 94a for non-covered sampling points of the fragment (in this case the first and third sampling points). The previously stored data 90 is also blended in a second blender 94b using fragment data 92 for covered sampling points of the fragment (in this case the second and fourth sampling points). The respective results 96a and 96b generated by the blenders 94a and 94b are then appropriately stored in the tile buffer 10 for the respective covered and non-covered sampling points. Metadata 98 for the data stored in the tile buffer is updated so as to indicate that the resultant data which is stored in the tile buffer 10 in respect of the sampling positions to which the fragment corresponds is no longer the same for the sampling positions. As well as reducing the amount of read resources needed, it should be noted that the third 94c and fourth 94d blenders are not needed to blend the sampling points in this alternative version of step 79, and so the amount of processing resources needed to blend the sampling points when compared to conventional arrangements is reduced.

Referring again to FIG. 9, if the determination at step 77 is negative, then at step 81 the different sample data which has been previously generated and stored in the tile buffer in respect of the sampling positions to which the fragment corresponds is read from the tile buffer. A blending operation is then performed in respect of each of the sampling points of the fragment using the sample data read from the tile buffer, and the results of the blending operations are then written to the tile buffer for the sampling positions in question.

FIG. 10b schematically illustrates step 81 of FIG. 9. As discussed above, FIG. 10b shows that respective previously stored data 90a-d for the sampling positions in question is read from tile buffer 10, and is blended using fragment data 92 in respective blenders 94a-d. The respective results 96a-d generated by the blenders 94a-d are then stored in the tile buffer 10 for the respective sampling positions. Metadata 98 for the data stored in the tile buffer remains the same so as to indicate that the resultant data which is stored in the tile buffer 10 in respect of the sampling positions to which the fragment corresponds is still not the same for the sampling positions.

Referring again to FIG. 9, if the determination at step 75 is negative, then it is determined at step 84 whether or not the data which has been previously generated and stored in the tile buffer in respect of the sampling positions to which the fragment corresponds is the same for all those sampling positions. This determination may be made by reading metadata for the sampling positions to which the fragment corresponds, as discussed above.

If the determination at step 84 is positive, then at step 86 a blending operation is performed in respect of each of the sampling points of the fragment, and the results of the blending operations are then written to the tile buffer for the sampling positions in question. Metadata for the data stored in the tile buffer is updated to indicate that the resultant data which is stored in the tile buffer in respect of the sampling positions to which the fragment corresponds is now not the same for those sampling positions.

Figure 10F:
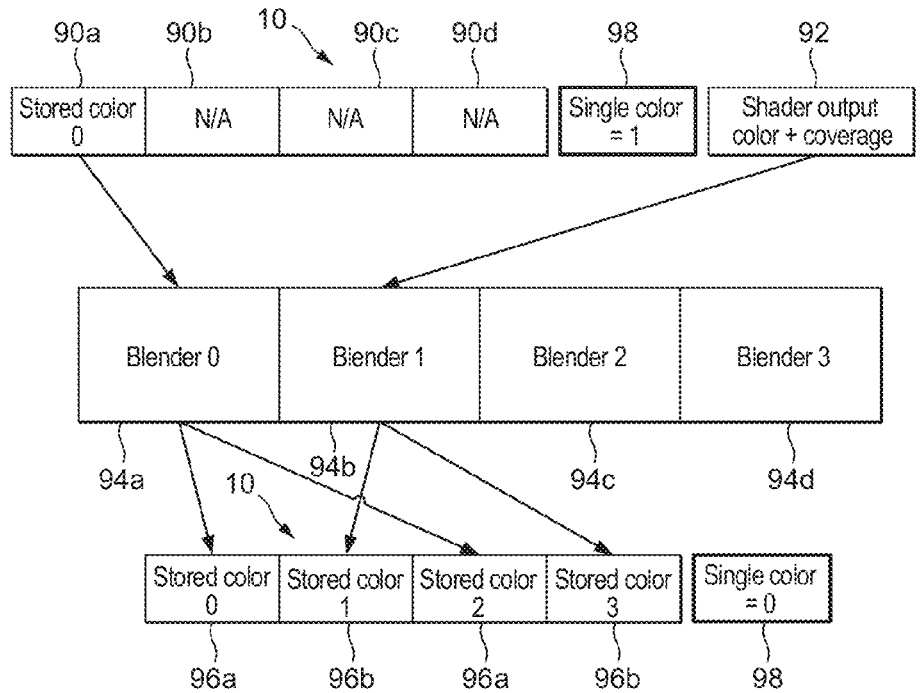

FIG. 10*f* schematically illustrates step 86 of FIG. 9. FIG. 10*f* shows that a single instance of previously stored data 90*a* for non-covered sampling points of the fragment (in this case the first and third sampling points) is read from tile buffer 10. The previously stored data 90*a* is passed through a first blender 94*a* to give a first result 96*a*. Fragment data 92 for covered sampling points of the fragment (in this case the second and fourth sampling points) is also processed in (or passed straight through) a second blender 94*b* to give a second result 96*b*. The respective results 96*a* and 96*b* produced by the blenders 94*a* and 94*b* are then appropriately stored in the tile buffer 10 for the respective covered and non-covered sampling points. Metadata 98 for the data stored in the tile buffer 10 is updated so as to indicate that the resultant data which is stored in the tile buffer 10 in respect of the sampling positions to which the fragment corresponds is no longer the same for the sampling positions. It should be noted that only a single tile buffer read operation (to access data 90*a*) is needed to blend the sampling points in step 86, and so the amount of read resources needed to blend the sampling points when compared to conventional arrangements is reduced. As well as reducing the amount of read resources needed, it should also be noted that the third 94*c* and fourth 94*d* blenders are not needed to blend the sampling points, and so the amount of processing resources needed to blend the sampling points when compared to conventional arrangements is reduced.

If the determination at step 84 is negative, then at step 88 a blending operation is also performed in respect of each of the sampling points of the fragment, and the results of the blending operations are then written to the tile buffer for the sampling positions to which the fragment corresponds. Metadata for the data stored in the tile buffer remains the same to indicate that the resultant data which is stored in the tile buffer in respect of the sampling positions to which the fragment corresponds is still not the same for those sampling positions.

Figure 10G:
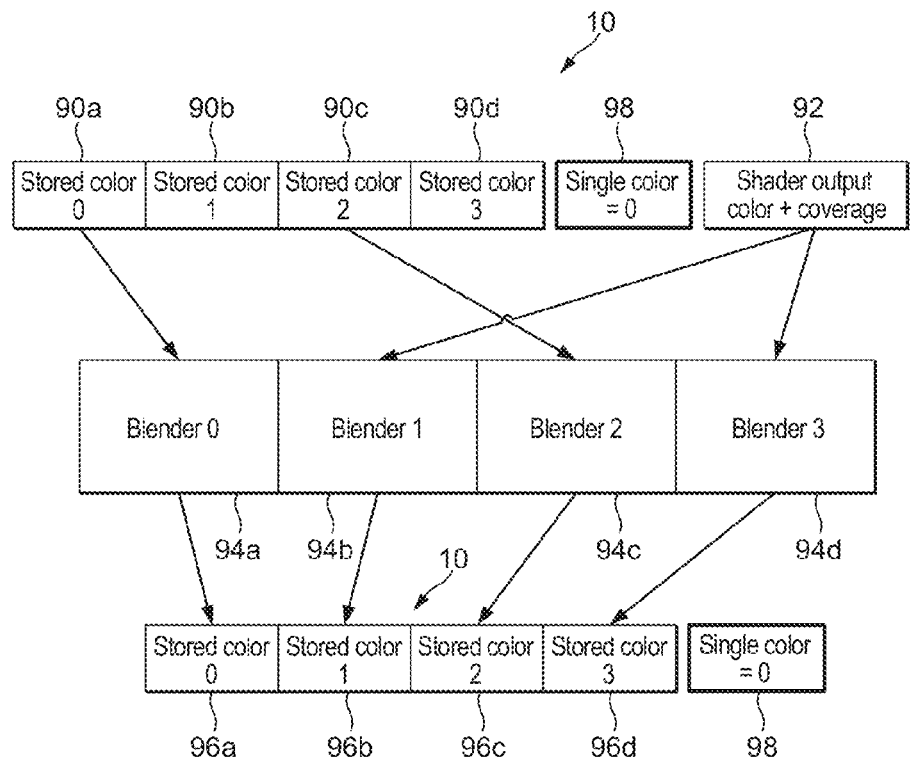

FIG. 10*g* schematically illustrates step 88 of FIG. 9. FIG. 10*g* shows that the previously stored data 90*a* and 90*c* for non-covered sampling points of the fragment (in this case the first and third sampling points) is read from tile buffer 10. The previously stored data 90*a* and 90*c* is passed through a first blender 94*a* and a third blender 94*c* to give a first result 96*a* and a third result 96*c* respectively. Fragment data 92 for covered sampling points of the fragment (in this case the second and fourth sampling points) is also processed in (or passed straight through) a second blender 94*b* and a fourth blender 94*d* to give a second result 96*b* and a fourth result 96*d* respectively. The respective results 96*a-d* produced by the blenders 94*a-d* are then appropriately stored in the tile buffer 10 for the respective covered and non-covered sampling points. Metadata 98 for the data stored in the tile buffer 10 remains the same so as to indicate that the resultant data which is stored in the tile buffer 10 in respect of the sampling positions to which the fragment corresponds is still not the same for the sampling positions. (In an alternative embodiment, the number of blenders used for step 88 can be reduced by passing the fragment data 92 for covered sampling points of the fragment only through the second blender 94*b* to give the second result 96*b*. The second result 96*b* produced by the second blender 94*b* can then appropriately stored in the tile buffer 10 for the respective (second and fourth) covered sampling points.)

Figure 10H:
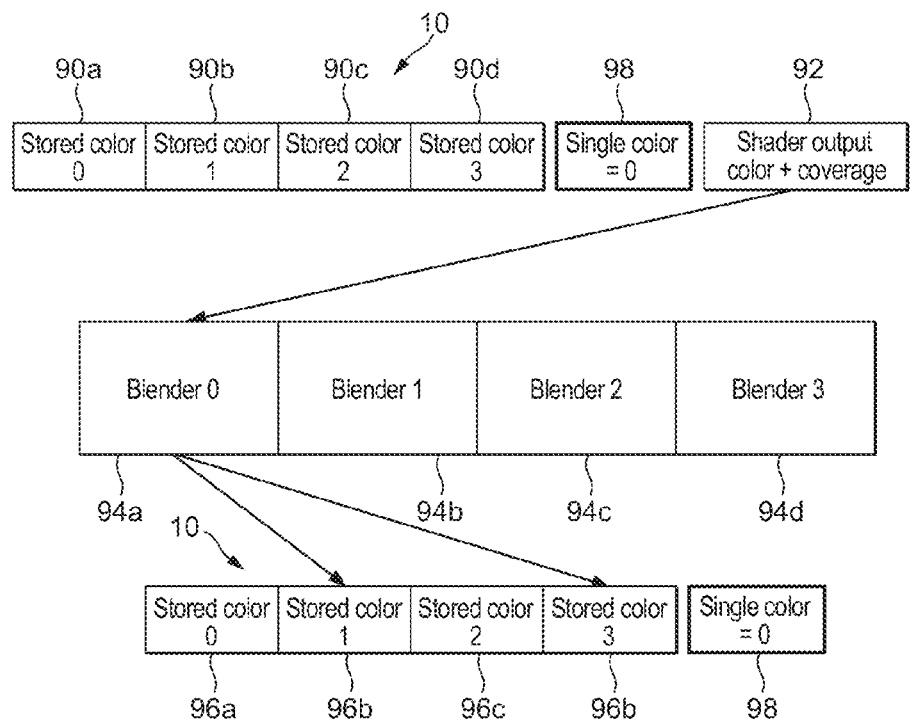

FIG. 10*h* schematically illustrates an alternative for step 88 of FIG. 9. FIG. 10*h* shows that the previously stored data 90*a* and 90*c* for non-covered sampling points of the fragment (in this case the first and third sampling points) is not read from tile buffer 10. Instead, only fragment data 92 for covered sampling points of the fragment (in this case the second and fourth sampling points) is processed in (or passed straight through) a first blender 94*a* to give a result 96*b*. The result 96*b* produced by the first blender 94*b* is then appropriately stored in the tile buffer 10 for the respective covered sampling points. The stored data for the non-covered sampling points remains unchanged. The metadata 98 for the data stored in the tile buffer remains the same to indicate that the resultant data which is stored in the tile buffer 10 in respect of the sampling positions to which the fragment corresponds is still not the same for those sampling positions. It should be noted that no tile buffer read operations (to access data 90*a-d*) are needed to blend the sampling points in this alternative, and so the amount of read resources needed to blend the sampling points when compared to conventional arrangements is reduced. As well as reducing the amount of read resources needed, it should also be noted that the second 94*b*, third 94*c* and fourth 94*d* blenders are not needed to blend the sampling points, and so the amount of processing resources needed to blend the sampling points when compared to conventional arrangements is reduced.

Optionally, following any or all of the above steps in which multiple blending operations are performed to give respective results, a comparison of the results of those blending operations may be made to determine if those results are, in fact, the same (e.g. by coincidence). If they are the same then the metadata 98 for the stored sample data in the tile buffer 10 may be updated to indicate this. The "corrected" metadata 98 can then be used to optimise subsequent graphics processing operations.

Figure 11:
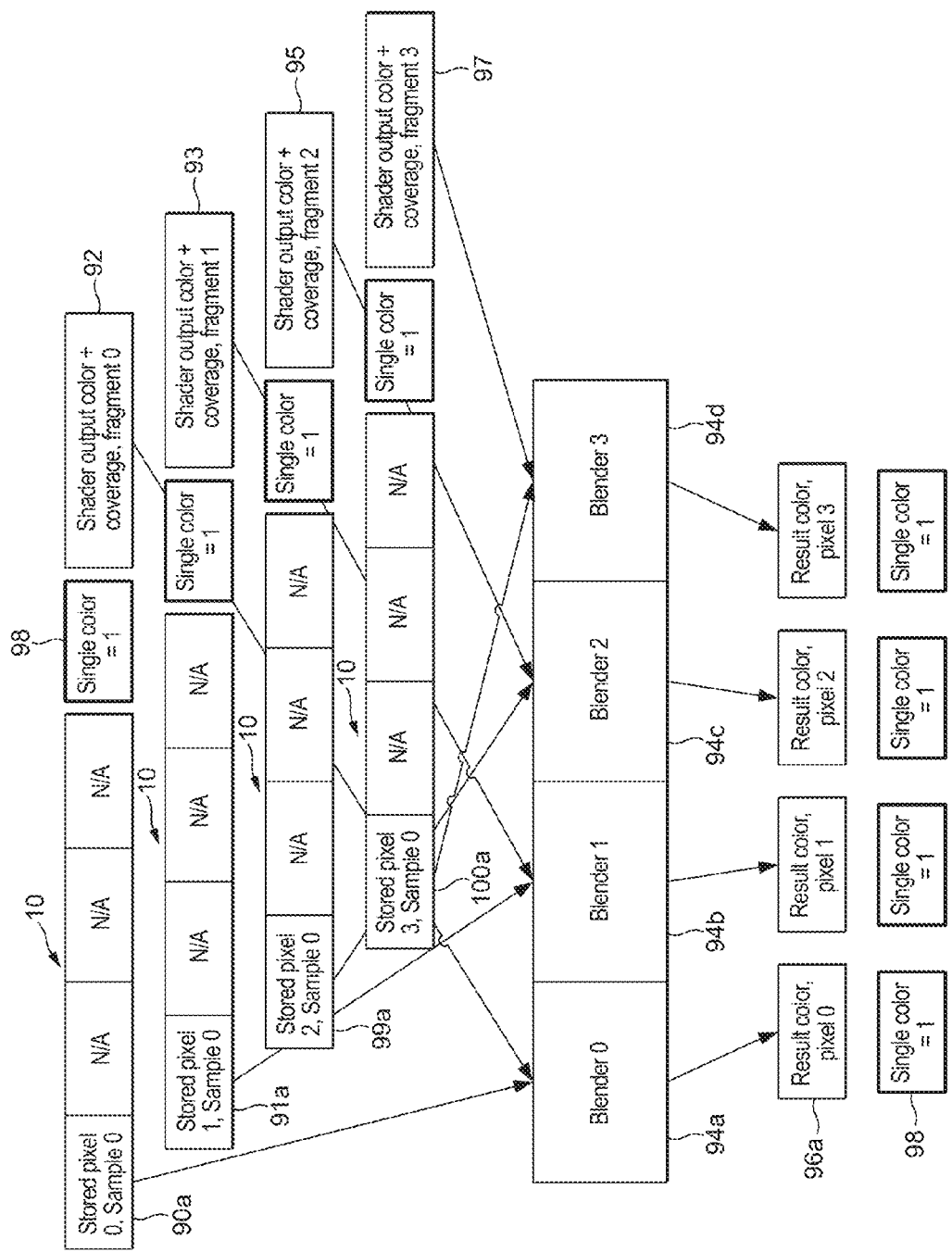
FIG. 11 shows schematically the parallel processing of plural fragments in an embodiment of the technology described herein.

FIG. 11 schematically illustrates a mode of operation where it has been determined that first, second, third and fourth fragments can be processed, in parallel, in the manner of step 78 of FIG. 9.

FIG. 11, like FIG. 10*a*, shows that a single instance of previously stored data 90*a* is read from tile buffer 10 for a first fragment, and is blended using fragment data 92 for the first fragment in a first blender 94*a*. In FIG. 10*a*, the second 94*b*, third 94*c* and fourth 94*d* blenders are not used. In FIG. 11, however, a single instance of previously stored data 91*a* is read from tile buffer 10 for a second fragment, and is blended using fragment data 93 for the second fragment in a second blender 94*b*. Similarly, a single instance of previously stored data 99*a* is read from tile buffer 10 for a third fragment, and is blended using fragment data 95 for the third fragment in a third blender 94*c*. Similarly, a single instance of previously stored data 100*a* is read from tile buffer 10 for the fourth fragment, and is blended using fragment data 97 for the fourth fragment in a fourth blender 94*d*. This process allows blenders 94*b-d*, which would otherwise be left idle when performing step 78 (see FIG. 10*a*), to process other fragments which can be processed in the manner of step 78. This approach can significantly reduce the amount of time needed to process plural fragments.

The respective results for the fragments generated by the blenders 94*a-d* are then stored in the tile buffer 10. Metadata 98 for the data stored in the tile buffer for each fragment remains the same to indicate that the resultant data which is stored in the tile buffer 10 for the sampling positions to which that fragment corresponds (was being used to render) is still the same for those sampling positions.

It will be appreciated from the above that, once the fragments have been blended, their data is stored appropriately in the tile buffers 10. In particular, if the data for each of the sampling points of a rendered fragment is different, then the data for that rendered fragment is stored in the appropriate sample position(s) in the tile buffer array 10 as indicated by the coverage mask 63 associated with that fragment, so as to provide a separate set of fragment data for each individual covered sample position associated with the fragment. However, if the data for each of the sampling points of a rendered fragment is the same, then the data for that rendered fragment may be stored in only one sample position(s) in the tile buffer array 10, so as to provide a single set of fragment data for the sample positions associated with the fragment.

The fragment data that is stored in the tile buffers 10 comprises the colour (RGB), and transparency (A) values for each sample position, as discussed above. This data can be stored in any suitable form.

As the tile buffers 10 each contain 32×32 data positions, the tile buffers 10 can store four sampling position values for each pixel of a 16×16 pixel tile, i.e. the tile buffers 10 natively support 4×MSAA for 16×16 pixel tiles.

This process is repeated for each fragment generated for rendering a given primitive. Once this process has been completed for all the fragments relating to a given primitive, it is then repeated for subsequent primitives of the output, e.g. image (since, as discussed above, the image will typically be made up of plural primitives, and not just a single primitive). The process is repeated for all the primitives within the tile in question, until the tile buffers 10 have the appropriate data stored in each of their sample positions.

The data stored in the tile buffers 10 is then exported to the downsampling unit 11 for downsampling and subsequent exporting to the, e.g. frame buffer 13 for display, as is known in the art.

As discussed above, the downsampling unit 11 can provide 4× downsampling, i.e. such that four data entries stored in the tile buffers 10 will be downsampled to a single output data value (pixel) 14 per clock cycle. Thus, when performing 4×MSAA, the downsampling unit 11 may take four sampling position values, corresponding to the four samples that are taken for each pixel of the output image (as shown in FIG. 3) (since a 4× sampling mask is being used) and downsample them to a single pixel output value 14 for output to the frame buffer 13 in a single pass (clock cycle).

Where the metadata 98 for the four sampling positions for a given output pixel indicates that the sample data in the tile buffer is not the same for the four sampling positions, then the downsampling may be achieved by taking an average of the sampling position values for the four sampling positions, and outputting the average to the frame buffer. However, where the metadata 98 for the four sampling position values indicates that the sample data in the tile buffer is the same for the four sampling positions of the pixel in question, then the downsampling may be achieved by reading a single instance of the sample data for one of the four sampling positions and writing that single instance of the sample data to the frame buffer for the pixel in question. It should be noted that this use of metadata (i.e. to determine that averaging need not take place for the sampling positions in question) can lead to a reduction in the amount of processing resources needed to downsample the sampling position values to a single output "pixel" value.

Once a given tile of the output (e.g. frame) has been processed in this manner, the next tile can then be processed in the same way, and so on, until all the tiles making up the desired output (e.g. frame for display) have been processed and output to the, e.g., frame buffer. The next output, e.g., frame for display, can then be generated in the same manner, and so on.

Although the present embodiments are described above with respect to carrying out 4×MSAA using a graphics processing pipeline that has processing stages configured to natively support 4×MSAA, the same principles can be applied to any number of samples, such as 8×MSAA or 16×MSAA or higher.

Furthermore, the above principles for blending fragments in the manner of the technology described herein can be correspondingly and suitably applied to other stages of the graphics processing pipeline. For example, the early depth and stencil test and/or the late depth and stencil test may be operated and performed in a corresponding manner.

For example, for a depth test, it may be determined from the coverage mask for a fragment whether or not all the sampling points of that fragment are covered by the primitive in question for that fragment. This is similar to step 72 in FIG. 9.

(In some situations, it may be known that the sampling points of the fragment (if covered by the fragment) will all have the same depth value. This may be the case, for example, where the primitives in the scene to be rendered are always parallel to the output (display), such as primitives for a user interface, or where each fragment has only a single depth value in its fragment data. However, in other situations, it may not be known whether or not the sampling points of the fragment (even if all covered by the primitive) will all have the same depth value. In these other situations, it may be determined whether or not the sampling points of the fragment all have the same depth value. This determination may be made by comparison of the depth values for the sampling points of the fragment or by reading fragment metadata which indicates whether or not the depth values for the sampling points of the fragment are the same.)

If it is known or determined that the covered sampling points of the fragment all have the same depth value, then it may be determined whether or not depth data which has been previously generated and stored in the depth buffer in respect of the sampling positions to which the fragment corresponds is the same for all those sampling points. This determination may again be made by reading metadata that indicates whether or not the depth data which has been previously generated and stored in the depth buffer in respect of the sampling positions to which the fragment corresponds is the same for all those sampling positions. Thus, in this case, respective metadata may be associated with the depth values in the depth buffer to indicate whether respective depth values for respective sets of sampling positions should all be treated as being the same or not, in a corresponding manner to the metadata 98 for the tile buffer 10 shown in FIGS. 7*a* and 7*b*. This metadata may or may not be the same metadata which is used to indicate whether or not the sample data which has been previously generated and stored in the tile buffer in respect of the sets of sampling positions to which pixels and fragments correspond is the same for those sampling positions. This is similar to steps 76, 77 and 84 in FIG. 9.

If it is determined that the depth data which has been previously generated and stored in the depth buffer in respect of the sampling positions to which the fragment corresponds is the same for the sampling positions, then a single instance of that depth data may be read from the depth buffer. A single depth test may then be performed in respect of one of the sampling points of the fragment using the depth data read from the depth buffer and the depth data in the fragment data for the fragment. The fragment can then be retained for further graphics processing on the basis of that single depth test if the sampling points are not occluded, and the depth data in the depth buffer appropriately updated to comprise the depth data from the fragment data for the fragment. Alternatively, the fragment may be removed from further graphics processing on the basis of that single depth test, and/or the depth data in the depth buffer may remain the same, if the sampling points are occluded.

If it is determined that the depth data which has been previously generated and stored in the depth buffer in respect of the sampling positions to which the fragment corresponds is not the same for the sampling points, then respective depth tests may be performed in respect of the sampling points of the fragment. The depth data in the depth buffer may then be appropriately updated for those sampling points determined to be, for example, closer to the output plane. If all of the sampling points of the fragment are determined to be, for example, closer to the output plane, then the metadata for the sampling positions corresponding to those sampling points may be updated to indicate that the depth data for those sampling positions is the same.

If it is determined that the sample points of a fragment are not all covered by the primitive in question for that fragment, then respective depth tests may be performed in respect of the sampling points of the fragment. The depth data in the depth buffer may then be appropriately updated for those sampling points determined to be, for example, closer to the output plane. The metadata for the sampling positions corresponding to the sampling points may be updated, if necessary, to indicate that the depth data for those sampling positions is not the same.

As well as the blending and depth/stencil testing stages, the above operation can be suitably applied to other stages of the graphics processing pipeline. For example, where the pipeline is able to perform sample frequency shading (i.e. fragment shading but on a "per sample" basis), then operation in the above manner could be used to optimise that sample frequency shading operation in a similar way (by having the sample frequency shader run respectively for each sample if the samples will produce different output results, but only once for each set of samples (for each fragment), if it can be determined that the result of the sample shading will be identical for each sample associated with the fragment). Additionally or alternatively, the number of distinct values could be exposed to the shader. Similar arrangements could be used for a blend shader.

Although in the present embodiment separate sets of metadata are used for the tile and depth buffers, other arrangements for the metadata would be possible. For example, there could be a single metadata bit that is common for all data channels for the set of sampling positions in question, or there could be separate metadata bits for each of the colour, depth, and stencil buffers. It would also, e.g., be possible to use separate metadata values for each render target if using multiple render targets, if desired.

As well as using the metadata to facilitate reduced sample processing in processing stages of the graphics processing pipeline as discussed above, the metadata 98 can also be used, for example, when writing sample data out of the graphics processing pipeline 1 to memory when it is known that the sample data will later be read back to the graphics processing pipeline 1 from memory. For example, where a group of sampling positions has the same sample data and this is indicated by the metadata for that group of sampling positions, rather than writing out (and later reading back) the sample data for each of the sampling positions, the sample data for a single sampling position can be written out (and later read back) based on, and together with, the metadata for the group of sampling positions. This can reduce the amount of bandwidth needed to write sample data from and read sample data into the graphics processing pipeline.

The Applicants have further recognised that the way that the sample data is stored in, e.g., the tile buffer 10, can be arranged to further improve the efficiency of the operation in the manner of the technology described herein. This is illustrated in FIGS. 8a and 8b.

Figure 8A:
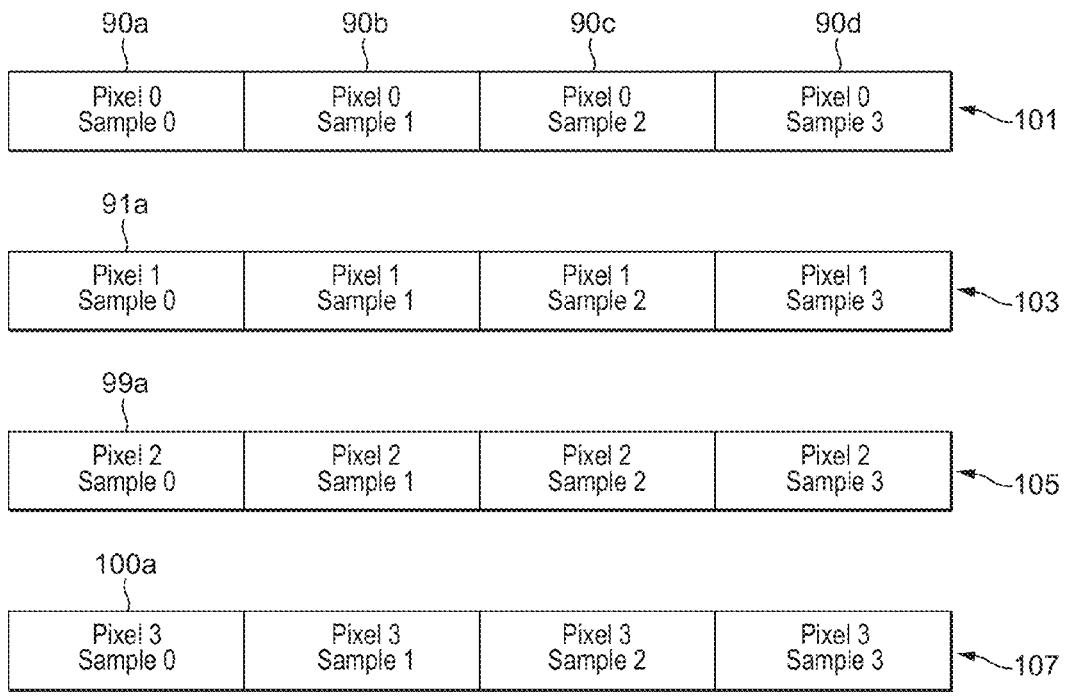
FIGS. 8a and 8b illustrate an array of sample data that is associated with the sampling positions to which plural fragments to be rendered correspond in an embodiment of the technology described herein.

FIG. 8a shows schematically one exemplary arrangement for storing an array of sample data in the tile buffer 10. FIG. 8a shows that sample data 90a-d for sampling positions corresponding to sampling points of a first fragment are stored in a first cache line 101 which can be read using a first read operation. Sample data starting at 91a for sampling positions corresponding to sampling points of a second fragment are stored in a second cache line 103 which can again be read using a second read operation. Similarly, sample data starting at 99a for sampling positions corresponding to sampling points of a third fragment are stored in a third cache line 105 which can be read using a third read operation. Similarly, sample data starting at 100a for sampling positions corresponding to sampling points of a fourth fragment are stored in a fourth cache line 105 which can be read using a fourth read operation.

In this arrangement, in order to read the sample data for the first to fourth fragments, four read operations are needed, one for each line of cache. This would be the case even where only the sample data for the first sampling position of each cache line is valid (i.e. sample data 90a, 91a, 99a and 100a).

Figure 8B:
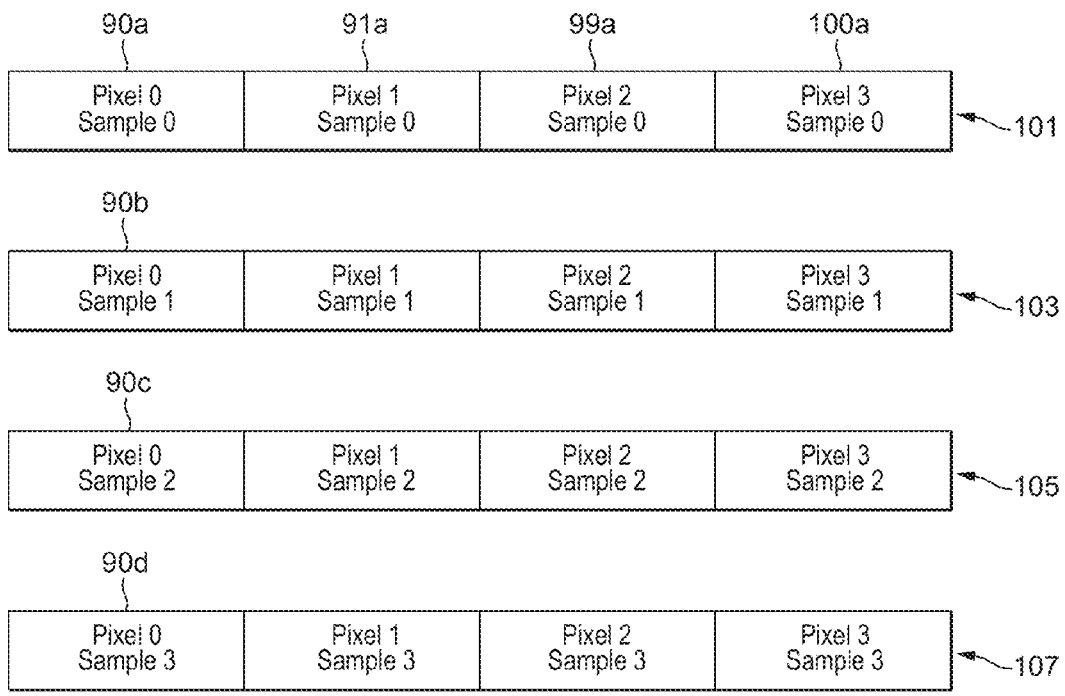

FIG. 8b shows schematically an alternative arrangement for the array of sample data that is stored in the tile buffer 10. FIG. 8b shows that only the sample data 90a for the first sampling position corresponding to the first sampling point of the first fragment are stored in cache line 101. Sample data 91a, 99a, 100a for the first sampling positions corresponding to the first sampling points of the second to fourth fragments are also stored in cache line 101 (and so on).

With this arrangement, in the case when only the sample data for the first sampling positions corresponding to the first sampling points of the fragments is valid, in order to read the valid sample data for the fragments, only one read operation of the first line of cache 101 is needed. This can significantly reduced the time it takes to read the valid sample data for plural fragments being processed in the case where it is known that the respective stored sample data (e.g. tile buffer data) for the sampling positions associated with those fragments is the same.

It can be seen from the above that the technology described herein, in embodiments, provides a way to perform graphics processing in which the number of instances of the graphics processing operations needed to process the set of sampling points which a fragment represents can be reduced in comparison to conventional (e.g. multisampling) graphics processing techniques which perform graphics processing operations for fragments on a "per sample" basis.

This is achieved, in embodiments of the technology described herein, by determining whether respective graphics processing operations (e.g. respective blends, respective depth tests) would produce the same result for each of plural sampling points. If it is determined that respective graphics processing operations would produce the same result for each of the plural sampling points, then only a single instance of the graphics processing operation is performed and the result of that graphics processing operation is associated with each sampling point. The determination of whether or not the same result would be produced is facilitated by providing metadata which indicates whether or not the fragment data and/or stored sample data for use when processing the sampling points is the same.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of processing a graphics fragment in a graphics processing pipeline, wherein the graphics processing pipeline has processing circuitry configured to perform processing for a plurality of processing stages, and wherein graphics fragments to be processed by the processing circuitry of the graphics processing pipeline each represent a set of sampling points to be processed, the method comprising:
   determining whether a graphics processing operation to be performed by the processing circuitry for a processing stage of the graphics processing pipeline on respective plural sampling points of a subset of a set of sampling points that a graphics fragment represents would, if performed for that processing stage of the graphics processing pipeline in respect of each of the plural sampling points of the subset, produce the same result for each of the plural sampling points of the subset;
   if it is determined that the graphics processing operation would produce the same result for each of the plural sampling points of the subset, performing by the processing circuitry only a single instance of the graphics processing operation for the plural sampling points of the subset for that processing stage of the graphics processing pipeline to produce a result, the single instance of the graphics processing operation being performed in respect of only one of the sampling points of the plural sampling points of the subset to produce the result; and
   associating the result which is produced by the single instance of the graphics processing operation with each sampling point of the plural sampling points of the subset;
   wherein the step of determining whether a graphics processing operation to be performed by the processing circuitry for a processing stage of the graphics processing pipeline on respective plural sampling points of a subset of a set of sampling points that a graphics fragment represents would, if performed for that processing stage of the graphics processing pipeline in respect of each of the plural sampling points of the subset, produce the same result for each of the plural sampling points of the subset includes:
   determining whether the graphics processing operation to be performed by the processing circuitry for the processing stage of the graphics processing pipeline on the respective plural sampling points of the subset is dependent on data which has previously been generated and stored by the graphics processing pipeline in respect of sampling positions to which the plural sampling points of the subset correspond;
   if it is determined that the graphics processing operation is dependent on the data which has previously been generated and stored by the graphics processing pipeline, determining whether the data which has previously been generated and stored by the graphics processing pipeline is the same for all of the sampling positions to which the plural sampling points of the subset correspond; and
   if it is determined that the data which has previously been generated and stored by the graphics processing pipeline is the same for all of the sampling positions to which the plural sampling points of the subset correspond, determining that the graphics processing operation would produce the same result for each of the plural sampling points of the subset;
   wherein the step of determining whether the graphics processing operation to be performed by the processing circuitry for the processing stage of the graphics processing pipeline on the respective plural sampling points of the subset is dependent on data which has previously been generated and stored by the graphics processing pipeline in respect of the sampling positions to which the plural sampling points of the subset correspond includes at least one of:
   (i) determining whether a process or a function to be used for the graphics processing operation to be performed by the processing circuitry for the processing stage of the graphics processing pipeline on the respective plural sampling points of the subset indicates that at least some of the data which has previously been generated and stored by the graphics processing pipeline is to be used for the graphics processing operation; and if it is determined that the process or the function indicates that at least some of the data which has previously been generated and stored by the graphics processing pipeline is to be used for the graphics processing operation, determining that the graphics processing operation is dependent on data which has previously been generated and stored by the graphics processing pipeline; and
   (ii) determining whether an alpha value in fragment data for the graphics fragment indicates partial or full opacity for the plural sampling points of the subset of the set of sampling points that the graphics fragment represents; and if it is determined that the alpha value in the fragment data for the graphics fragment indicates partial opacity for the plural sampling points of the subset of the set of sampling points that the graphics fragment represents, determining that the graphics processing operation is dependent on data which has previously been generated and stored by the graphics processing pipeline; but if it is determined that the alpha value in the fragment data for the graphics fragment indicates full opacity for the plural sampling points of the subset of the set of sampling points that the graphics fragment represents, determining that the graphics processing operation is not dependent on data which has previously been generated and stored by the graphics processing pipeline.

2. A method as claimed in claim 1, wherein the graphics processing operation further comprises at least one of:
a rendering operation; a fragment shading operation; a blending operation; a culling test; a depth test; and a stencil test.

3. A method as claimed in claim 1, wherein:
metadata is associated with the plural sampling points, the metadata indicating whether or not particular sample data which would be used at the processing stage of the graphics processing pipeline in respect of each of the plural sampling points is the same for each of the plural sampling points.

4. A method as claimed in claim 1, further comprising:
when associating the result which is produced by the single instance of the graphics processing operation with each sampling point of the plural sampling points, storing metadata in association with the plural sampling points, the metadata indicating that stored sample data values associated with the plural sampling points are the same.

5. A method as claimed in claim 1, further comprising:
performing the single instance of the graphics processing operation using a first graphics processing resource; and
in parallel with performing the single instance of the graphics processing operation using the first graphics processing resource, producing a second result for a second different subset of the set of sampling points that the graphics fragment represents using a second graphics processing resource.

6. A method as claimed in claim 1, wherein each set of sampling points corresponds to a set of sampling positions of an array of sampling positions representing an output to be generated by the graphics processing pipeline, the method further comprising:
storing an array of sample data values to be used by the processing stage of the graphics processing pipeline when processing graphics fragments to generate an output to be generated by the graphics processing pipeline, the array of sample data values indicating sample data values to be used for respective sampling positions of the array of sampling positions representing the output to be generated by the graphics processing pipeline; and
storing, for respective groups of plural sampling positions that the stored array of sample data values represents, metadata indicating whether or not the plural sampling positions of each group are associated with the same stored sample data value in the stored array of sample data values.

7. A method as claimed in claim 6, further comprising:
when associating the result which is produced by the single instance of the graphics processing operation with each sampling point of the plural sampling points, updating the metadata for the group of plural sampling positions that correspond to the plural sampling points to indicate that stored sample data values associated with the plural sampling points are the same.

8. A method as claimed in claim 1, wherein there is other sample data to be combined with or compared with fragment data for the graphics fragments, the method further comprising:

prior to performing the graphics processing operation at the stage of the graphics processing pipeline:
reading metadata associated with other sample data that is stored for the plural sampling points, the metadata indicating whether or not the plural sampling points are associated with the same stored sample data value to be used in the graphics processing operation,
determining from the metadata whether the plural sampling points are associated with the same stored sample data value to be used in the graphics processing operation, and
if it is determined from the metadata that the plural sampling points are associated with the same stored sample data value to be used in the graphics processing operation, reading only a single instance of the stored sample data value from memory for use in the graphics processing operation at that stage of the graphics processing pipeline.

9. A graphics processing pipeline comprising:
processing circuitry configured to perform processing for a rasteriser that generates graphics fragments and passes those graphics fragments to processing circuitry configured to perform processing for later stages of the graphics processing pipeline for processing, wherein each graphics fragment represents a set of sampling points; and
processing circuitry for a graphics processing stage that receives graphics fragments for processing, configured to:
determine, for a graphics fragment it receives for processing, whether a graphics processing operation to be performed by that processing stage of the graphics processing pipeline on respective plural sampling points of a subset of the set of sampling points that the graphics fragment represents would, if performed in respect of each of the plural sampling points of the subset, produce the same result for each of the plural sampling points of the subset,
if it is determined that the graphics processing operation would produce the same result for each of the plural sampling points of the subset, perform only a single instance of the graphics processing operation for the plural sampling points of the subset to produce a result, the single instance of the graphics processing operation being performed in respect of only one of the sampling points of the plural sampling points of the subset to produce the result; and
associate the result which is produced by the single instance of the graphics processing operation with each sampling point of the plural sampling points of the subset;
wherein the processing circuitry for the graphics processing stage that receives graphics fragments for processing is configured to determine, for the graphics fragment it receives for processing, whether the graphics processing operation to be performed by that processing stage of the graphics processing pipeline on respective plural sampling points of the subset of the set of sampling points that the graphics fragment represents would, if performed in respect of each of the plural sampling points of the subset, produce the same result for each of the plural sampling points of the subset by:
determining whether the graphics processing operation to be performed by the processing stage of the graphics processing pipeline on the respective plural sampling points of the subset is dependent on data which has previously been generated and stored by the graphics processing pipeline in respect of sampling positions to which the plural sampling points of the subset correspond;

if it is determined that the graphics processing operation is dependent on the data which has previously been generated and stored by the graphics processing pipeline, determining whether the data which has previously been generated and stored by the graphics processing pipeline is the same for all of the sampling positions to which the plural sampling points of the subset correspond; and if it is determined that the data which has previously been generated and stored by the graphics processing pipeline is the same for all of the sampling positions to which the plural sampling points of the subset correspond, determining that the graphics processing operation would produce the same result for each of the plural sampling points of the subset;

wherein the processing circuitry for the graphics processing stage that receives graphics fragments for processing is configured to determine whether the graphics processing operation to be performed by the processing stage of the graphics processing pipeline on the respective plural sampling points of the subset is dependent on data which has previously been generated and stored by the graphics processing pipeline in respect of the sampling positions to which the plural sampling points of the subset correspond by at least one of:

(i) determining whether a process or a function to be used for the graphics processing operation to be performed by the processing stage of the graphics processing pipeline on the respective plural sampling points of the subset indicates that at least some of the data which has previously been generated and stored by the graphics processing pipeline is to be used for the graphics processing operation; and if it is determined that the process or the function indicates that at least some of the data which has previously been generated and stored by the graphics processing pipeline is to be used for the graphics processing operation, determining that the graphics processing operation is dependent on data which has previously been generated and stored by the graphics processing pipeline; and (ii) determining whether an alpha value in fragment data for the graphics fragment indicates partial or full opacity for the plural sampling points of the subset of the set of sampling points that the graphics fragment represents; and if it is determined that the alpha value in the fragment data for the graphics fragment indicates partial opacity for the plural sampling points of the subset of the set of sampling points that the graphics fragment represents, determining that the graphics processing operation is dependent on data which has previously been generated and stored by the graphics processing pipeline; but if it is determined that the alpha value in the fragment data for the graphics fragment indicates full opacity for the plural sampling points of the subset of the set of sampling points that the graphics fragment represents, determining that the graphics processing operation is not dependent on data which has previously been generated and stored by the graphics processing pipeline.

10. A graphics processing pipeline as claimed in claim 9, wherein the graphics processing operation further comprises at least one of:

a rendering operation; a fragment shading operation; a blending operation; a culling test; a depth test; and a stencil test.

11. A graphics processing pipeline as claimed in claim 9, wherein:

metadata is associated with the plural sampling points, the metadata indicating whether or not particular sample data which would be used at the processing stage of the graphics processing pipeline in respect of each of the plural sampling points is the same for each of the plural sampling points.

12. A graphics processing pipeline as claimed in claim 9, wherein the processing circuitry is further configured to:

when associating the result which is produced by the single instance of the graphics processing operation with each sampling point of the plural sampling points, store metadata in association with the plural sampling points, the metadata indicating that stored sample data values associated with the plural sampling points are the same.

13. A graphics processing pipeline as claimed in claim 9, wherein the processing circuitry is further configured to:

perform the single instance of the graphics processing operation using a first graphics processing resource; and in parallel with performing the single instance of the graphics processing operation using the first graphics processing resource, produce a second result for a second different subset of the set of sampling points that the graphics fragment represents using a second graphics processing resource.

14. A graphics processing pipeline as claimed in claim 9, wherein each set of sampling points corresponds to a set of sampling positions of an array of sampling positions representing an output to be generated by the graphics processing pipeline, the processing circuitry being further configured to:

store an array of sample data values to be used by the processing stage of the graphics processing pipeline when processing graphics fragments to generate an output to be generated by the graphics processing pipeline, the array of sample data values indicating sample data values to be used for respective sampling positions of the array of sampling positions representing the output to be generated by the graphics processing pipeline; and store, for respective groups of plural sampling positions that the stored array of sample data values represents, metadata indicating whether or not the plural sampling positions of each group are associated with the same stored sample data value in the stored array of sample data values.

15. A graphics processing pipeline as claimed in claim 14, the processing circuitry being further configured to:

when associating the result which is produced by the single instance of the graphics processing operation with each sampling point of the plural sampling points, update the metadata for the group of plural sampling positions that correspond to the plural sampling points to indicate that stored sample data values associated with the plural sampling points are the same.

16. A graphics processing pipeline as claimed in claim 9, wherein there is other sample data to be combined with or compared with fragment data for the fragments, the processing circuitry being further configured to:

prior to performing the graphics processing operation at the stage of the graphics processing pipeline:

read metadata associated with other sample data that is stored for the plural sampling points, the metadata indicating whether or not the plural sampling points are associated with the same stored sample data value to be used in the graphics processing operation, determine from the metadata whether the plural sampling points are associated with the same stored sample data value to be used in the graphics processing operation, and if it is determined from the metadata that the plural sampling points are associated with the same stored sample data value to be used in the graphics processing operation, read only a single instance of the stored sample data value from memory for use in the graphics processing operation at that stage of the graphics processing pipeline.

17. A non-transitory computer readable storage medium storing computer software code which when executing on a processor performs a method of processing a graphics fragment in a graphics processing pipeline, wherein the graphics processing pipeline has processing circuitry configured to perform processing for a plurality of processing stages, and wherein graphics fragments to be processed by the processing circuitry of the graphics processing pipeline each represent a set of sampling points to be processed, the method comprising:

determining whether a graphics processing operation to be performed by the processing circuitry for a processing stage of the graphics processing pipeline on respective plural sampling points of a subset of a set of sampling points that a graphics fragment represents would, if performed for that processing stage of the graphics processing pipeline in respect of each of the plural sampling points of a subset, produce the same result for each of the plural sampling points of a subset;

if it is determined that the graphics processing operation would produce the same result for each of the plural sampling points of a subset, performing by the processing circuitry only a single instance of the graphics processing operation for the plural sampling points of the subset for that processing stage of the graphics processing pipeline to produce a result, the single instance of the graphics processing operation being performed in respect of only one of the sampling points of the plural sampling points of the subset to produce the result; and associating the result which is produced by the single instance of the graphics processing operation with each sampling point of the plural sampling points of the subset;

wherein the step of determining whether a graphics processing operation to be performed by the processing circuitry for a processing stage of the graphics processing pipeline on respective plural sampling points of a subset of a set of sampling points that a graphics fragment represents would, if performed for that processing stage of the graphics processing pipeline in respect of each of the plural sampling points of the subset, produce the same result for each of the plural sampling points of the subset includes:

determining whether the graphics processing operation to be performed by the processing circuitry for the processing stage of the graphics processing pipeline on the respective plural sampling points of the subset is dependent on data which has previously been generated and stored by the graphics processing pipeline in respect of sampling positions to which the plural sampling points of the subset correspond;

if it is determined that the graphics processing operation is dependent on the data which has previously been generated and stored by the graphics processing pipeline, determining whether the data which has previously been generated and stored by the graphics processing pipeline is the same for all of the sampling positions to which the plural sampling points of the subset correspond; and if it is determined that the data which has previously been generated and stored by the graphics processing pipeline is the same for all of the sampling positions to which the plural sampling points of the subset correspond, determining that the graphics processing operation would produce the same result for each of the plural sampling points of the subset;

wherein the step of determining whether the graphics processing operation to be performed by the processing circuitry for the processing stage of the graphics processing pipeline on the respective plural sampling points of the subset is dependent on data which has previously been generated and stored by the graphics processing pipeline in respect of the sampling positions to which the plural sampling points of the subset correspond includes at least one of:

(i) determining whether a process or a function to be used for the graphics processing operation to be performed by the processing circuitry for the processing stage of the graphics processing pipeline on the respective plural sampling points of the subset indicates that at least some of the data which has previously been generated and stored by the graphics processing pipeline is to be used for the graphics processing operation; and if it is determined that the process or the function indicates that at least some of the data which has previously been generated and stored by the graphics processing pipeline is to be used for the graphics processing operation, determining that the graphics processing operation is dependent on data which has previously been generated and stored by the graphics processing pipeline; and (ii) determining whether an alpha value in fragment data for the graphics fragment indicates partial or full opacity for the plural sampling points of the subset of the set of sampling points that the graphics fragment represents; and if it is determined that the alpha value in the fragment data for the graphics fragment indicates partial opacity for the plural sampling points of the subset of the set of sampling points that the graphics fragment represents, determining that the graphics processing operation is dependent on data which has previously been generated and stored by the graphics processing pipeline; but if it is determined that the alpha value in the fragment data for the graphics fragment indicates full opacity for the plural sampling points of the subset of the set of sampling points that the graphics fragment represents, determining that the graphics processing operation is not dependent on data which has previously been generated and stored by the graphics processing pipeline.

* * * * *